US010579658B2

(12) United States Patent
Freilinger et al.

(10) Patent No.: US 10,579,658 B2
(45) Date of Patent: Mar. 3, 2020

(54) ADAPTIVE ADJUSTMENT OF NETWORK RESPONSES TO CLIENT REQUESTS IN DIGITAL NETWORKS

(71) Applicant: SAP SE, Walldorf (DE)

(72) Inventors: Johann Freilinger, Hamburg (DE); Constantin Nicolai Vlad, Walldorf (DE)

(*) Notice: Subject to any disclaimer, the term of this patent is extended or adjusted under 35 U.S.C. 154(b) by 210 days.

(21) Appl. No.: 15/738,061

(22) PCT Filed: Jun. 13, 2016

(86) PCT No.: PCT/EP2016/000980
§ 371 (c)(1),
(2) Date: Dec. 19, 2017

(87) PCT Pub. No.: WO2017/005341
PCT Pub. Date: Jan. 12, 2017

(65) Prior Publication Data
US 2018/0307748 A1    Oct. 25, 2018

(30) Foreign Application Priority Data

Jul. 3, 2015   (EP) ................................. 15001994

(51) Int. Cl.
*G06F 16/33* (2019.01)
*G06F 16/335* (2019.01)
(Continued)

(52) U.S. Cl.
CPC ........ *G06F 16/3346* (2019.01); *G06F 16/337* (2019.01); *G06F 16/9535* (2019.01); *G06F 17/16* (2013.01)

(58) Field of Classification Search
CPC .................... G06F 16/3346; G06F 16/9535
See application file for complete search history.

(56) References Cited

U.S. PATENT DOCUMENTS

| 2010/0313141 A1 | 12/2010 | Yu et al. |
| 2011/0004588 A1 | 1/2011 | Leitersdorf et al. |

FOREIGN PATENT DOCUMENTS

| DE | 10 2015 008 607 A1 | 1/2017 |
| DE | 10 2015 008 607 B4 | 3/2017 |

(Continued)

OTHER PUBLICATIONS

International Search Report for PCT Application No. PCT/EP2016/000980, dated Aug. 22, 2016.
(Continued)

*Primary Examiner* — Hosain T Alam
*Assistant Examiner* — Anthony G Gemignani

(57) ABSTRACT

The present application relates to a computer network, a computer-implemented method, a computer system and computer program products for adaptively adjusting network responses to client requests received from a client device. A parsing module is introduced to generate a request data object based on data relevant to a client request. A matching module is introduced to: apply a learning method based on a final result generated in relation to calculating a matching score of potential service data objects, where the matching score is based on applying a matching algorithm; and generate a learning result of the learning method. A learning engine operable to adapt the matching algorithm of the matching module based on the learning result is introduced.

25 Claims, 16 Drawing Sheets

(51) Int. Cl.
*G06F 16/9535* (2019.01)
*G06F 17/16* (2006.01)

(56) References Cited

FOREIGN PATENT DOCUMENTS

| | | |
|---|---|---|
| EP | 3 113 037 A1 | 3/2015 |
| EP | 3 113 037 B1 | 3/2015 |

OTHER PUBLICATIONS

Raul Rojas; AdaBoost and the Super Bowl of Classifiers A Tutorial Introduction to Adaptive Boosting; published 2009; 6 pages; (http://www.inf.fu-berlin.de/inst/ag-ki/adaboost4.pdf).

Cunningham S J et al; Applications of Machine Learning in Information Retrieval; appears in Annual Review of Information Science and Technology, ASIS, XX, vol. 34, Jan. 1, 1999; pp. 341-384 (http://citeseerx.ist.psu.edu/viewdoc/summary?doi=10.1.1.148.4084).

"Information on proceedings before the Arbitration Board under the Employee Inventions Act," German Patent and Trade Mark Office (DPMA), Jun. 30, 2017, 3 pages.

Extended European Search Report, counterpart European application No. 15001994.1, dated Feb. 5, 2016, 12 pages.

Statement by Applicant SAP SE Regarding Ownership and Inventorship Issues, Jul. 26, 2019, 1 page.

210 userID, object ID, service type, location

| 220 User |
|---|
| UserID |
| Name |
| Address |
| Age |
| Gender |
| Contacts |
| Preferences |
| Profession |
| ObjectID |
| ServiceID |

| 240 Service |
|---|
| ServiceID |
| ContactInfo |
| Location |
| ServiceType |
| Pricing |
| BusinessHours |
| Rating |
| BrandType |

| 260 Owner |
|---|
| OwnerID |
| Contracts |
| Configuration |
| ObjectID |

| 250 Object |
|---|
| ObjectID |
| OwnerID |
| ObjectType |
| Brand |
| ManufacturingDate |
| Features |
| PurchaseValue |
| UtilityValue |

| 270 Acceptance |
|---|
| AcceptanceID |
| RequestID |
| UserID |
| Timestamp |
| OwnerID |

Fig. 2A

| 230 | Request |
|---|---|
| RequestID | |
| ObjectID: | ObjectType |
| | ManufacturingDate |
| ServiceType | |
| Location | |
| OwnerID: | Configuration |
| | Contracts |
| UserID: | Address |
| | Gender |
| | Contacts |
| | Age |
| | Profession |
| ServiceID: | ServiceType |
| | Pricing |
| | Rating |
| | BandType |

Fig. 2B

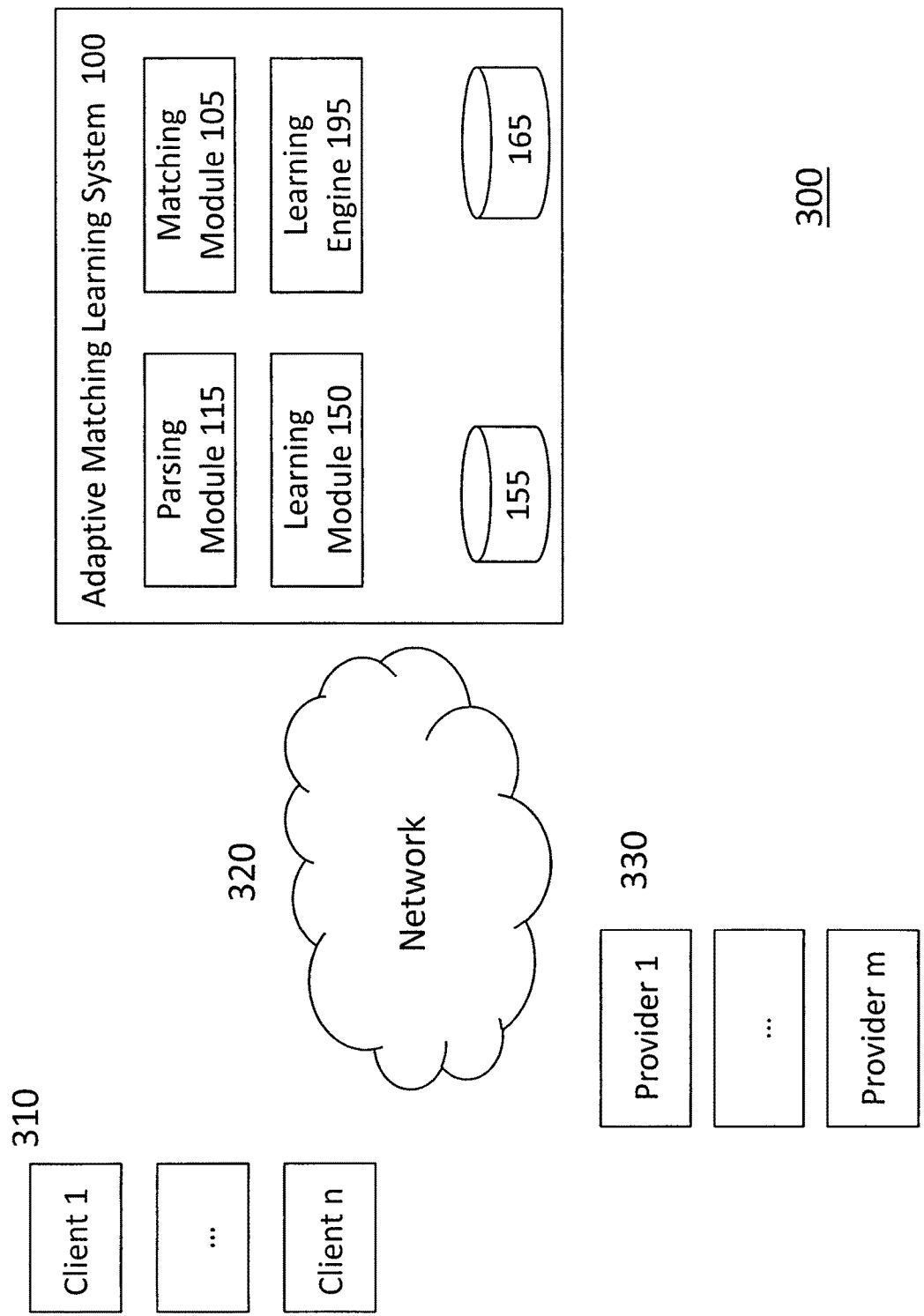

Boosting Basis 610

| | | Weak Learners | | |
|---|---|---|---|---|
| | | Determinant 1 | Determinant 2 | ... | Determinant n |
| Selected Service Data Objects (SDO) | SDO ID 2 | 0.33 | 0.5 | | 0.5 |
| | SDO ID 2 | 0.33 | 0.5 | | 0 |
| | SDO ID 3 | 0 | 1 | | 0 |
| | SDO ID 2 | 0.33 | 0.5 | | 0.5 |
| | SDO ID 3 | 0 | 1 | | 0 |

Calculate Errors 620

| | | Weak Learners | | |
|---|---|---|---|---|
| | | Determinant 1 | Determinant 2 | ... | Determinant n |
| Selected Service Data Objects (SDO) | SDO ID 2 | 0.066 | 0.1 | | 0.1 |
| | SDO ID 2 | 0.066 | 0.1 | | 0.2 |
| | SDO ID 3 | 0 | 0.2 | | 0 |
| | SDO ID 2 | 0.066 | 0.1 | | 0.1 |
| | SDO ID 3 | 0 | 0.2 | | 0 |
| Calculated Error | | 0.198 | 0.7 | | 0.6 |

Identify Determinant with Smallest Calculated Error 630

Updated Weightings 640

| | | Weightings |
|---|---|---|
| Selected Service Data Objects (SDO) | SDO ID 2 | 0.1506 |
| | SDO ID 2 | 0.1506 |
| | SDO ID 3 | 0.1476 |
| | SDO ID 2 | 0.1506 |
| | SDO ID 3 | 0.1476 |
| | | 0.7470 |

Normalize Updated Weightings 650

| | | Weightings |
|---|---|---|
| Selected Service Data Objects (SDO) | SDO ID 2 | 0.2016 |
| | SDO ID 2 | 0.2016 |
| | SDO ID 3 | 0.1976 |
| | SDO ID 2 | 0.2016 |
| | SDO ID 3 | 0.1976 |
| | | 1.0000 |

710 Receive Free-Text Feedback from User (User ID)

720 Parse Free-Text Feedback for Keywords

730 Extract Positive and/or negative Keywords from Free-Text Feedback

740 Extract Respective Determinant of Selected Service Data Object

750 Extract Weighting Associated with Extracted Determinant

760 Adapt Extracted Weighting Based on Extracted Keywords

Fig. 7

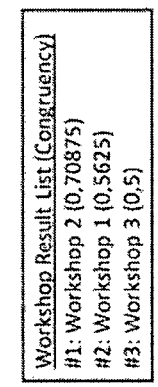

Potential Repair Data Object 230
Location: Street 1
Repair Data: Motor
Time: 0
User Name: Peter Pete
Gender : m
User Age: 30
User Preferences: clean, friendly, fast repair
Car Manufact.: BMW
Car Age: 2
Car Mileage: 20000
FleetManager Name: Mr. Fleet
FleetManager Deal-Breaker: PnC(WS1, WS2, WS3)

Fig. 12B

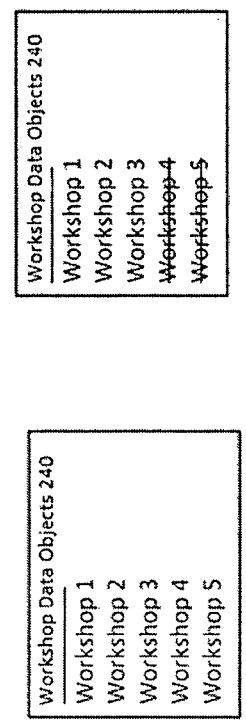

Workshop Result List (Congruency)
1: Workshop 2 (0,70875)
2: Workshop 1 (0,5625)
3: Workshop 3 (0,5)

Fig. 12E

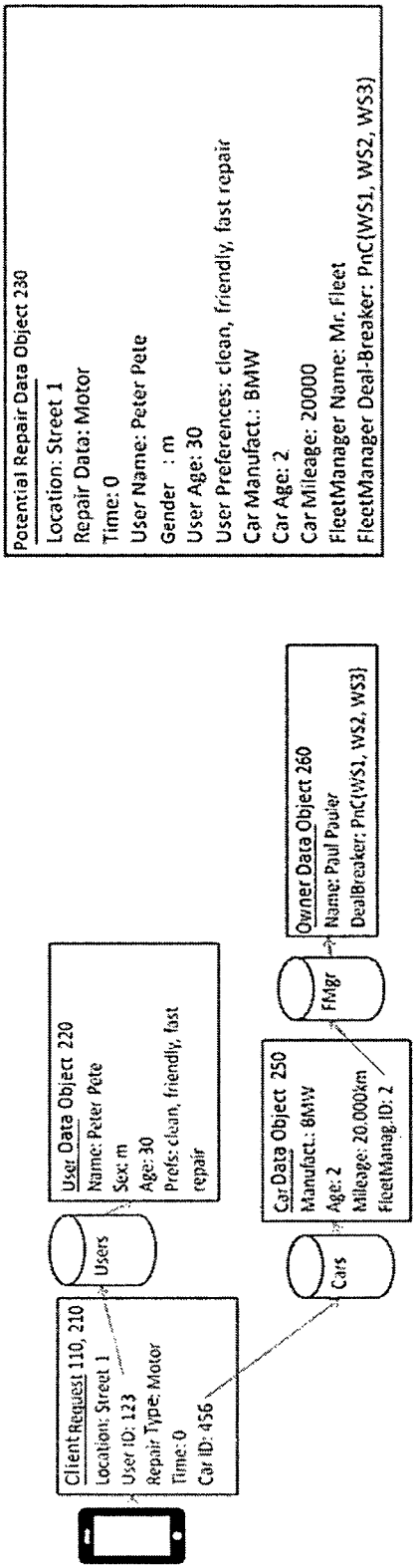

Fig. 12A

Workshop Data Objects 240
Workshop 1
Workshop 2
Workshop 3
Workshop 4
Workshop 5

Fig. 12C

Workshop Data Objects 240
Workshop 1
Workshop 2
Workshop 3
~~Workshop 4~~
~~Workshop 5~~

Fig. 12D

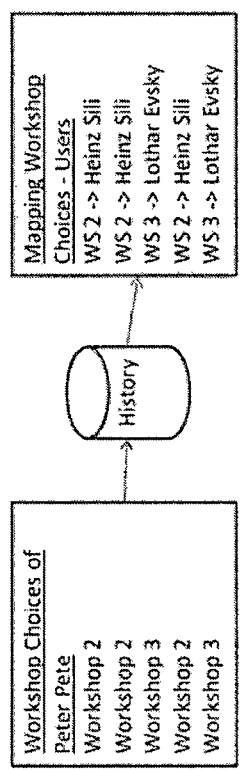

ADAPTIVE ADJUSTMENT OF NETWORK RESPONSES TO CLIENT REQUESTS IN DIGITAL NETWORKS

RELATED APPLICATIONS

This is a national phase application of international application No. PCT/EP2016/000980 filed on Jun. 13, 2016 that claims priority from EP application 15001994.1 filed on Jul. 3, 2015.

TECHNICAL FIELD

The description is directed generally to digital networks comprising digitally connected computer devices and, in particular, to a computer network, a computer system, a computer-implemented method, and a computer program product for adaptively adjusting network responses to client request to provide improved network responses.

BACKGROUND

The use of digital networks such as computer networks for providing network responses to client request is continuously increasing. Digital networks such as computer networks comprising a plurality of devices on a client side, such as a personal computer, a notebook, a mobile phone, a netbook, etc. providing client requests to a server and receiving responses from the server over the computer network are continuously growing. Such computer networks are usually based on a client server paradigm. According to the client server paradigm, a distributed computing structure is provided that partitions tasks or workloads between clients that provide client requests and servers that provide resources or services to the clients in response to a client request. In particular, each client may request a server's content or service function. To do so, the client provides the client request to a server. The client's credentials, e.g. login data, may be stored in a database associated with the server, and the server may accesses the database and verify the client's credentials. Upon successful verification, the server returns a response to the client request in accordance with the client request using the resources or services provided by the server.

Conventional client-server-based computer networks merely generate static server responses to the client request based on data received with the client request, although the servers may be able to access additional data via internal/external databases and/or e.g. via the Internet. This additional data might be helpful in providing server responses to client requests. However, the potential of this additional data is not used by conventional servers.

Consequently, there is a need to provide improved network responses to client requests specifically taking into account data not included in the client request that may be accessed by a respective server when generating the network response.

SUMMARY

This need is addressed by the subject matter of the independent claims. Particular examples are defined in the dependent claims.

According to a general aspect, a computer network for adaptively adjusting network responses to client requests to provide improved network responses is provided. The computer network comprises:

at least one client device for generating and transmitting client requests;
at least one provider for reacting to a client request via an adaptive machine-learning system; and
the adaptive machine-learning system comprising:
a parsing module operable to perform the following steps:
receiving a client request from a client device, the client request comprising at least a user ID and an object ID being subject of the client request;
parsing a request database for determining further relevant data based on the user ID and the object ID;
extracting the further relevant data from the request database to generate extracted data;
enriching the client request with the extracted data to generate an enriched client request; and
generating a request data object based on the enriched client request; a matching module operable to perform the following steps:
extracting respective determinants of the request data object and data objects stored in a response database, wherein each determinant is an attribute of a data object;
extracting weightings associated with the extracted determinants of the request data object and data objects stored in the response database;
applying a matching algorithm on the request data object with data objects stored in the response database to calculate a matching score of potential service data objects based on the extracted weightings; and
generating a final result, wherein the final result comprises a list of service data objects based on the matching score calculated by the matching algorithm;
a learning module operable to perform the steps of:
receiving the final result from the matching module;
applying a learning method based on the final result; and
generating a learning result of the learning method, the learning result comprising a selected service data object of the final result; and
a learning engine operable to adapt the matching algorithm of the matching module based on the learning result, wherein adapting the matching algorithm comprises applying a boosting algorithm for adapting the weightings associated with the determinants in the response database, the boosting algorithm comprising the steps of:
generating a boosting basis taking into account the current weightings assigned to the determinants;
calculating an error for each weighting;
identifying a determinant with the smallest calculated error; and
updating the weighting associated with the identified determinant the
response database based on the current weighting and the calculated error;
wherein the client device, the provider and the machine-learning system are coupled via a network.

The computer network may allow an adaptation of network responses to client requests so as to provide the client sending the client request with improved network responses. The computer network may comprise at least one client device, at least one provider and an adaptive machine-learning system. The client device, the provider and the adaptive machine-learning system may be coupled via a network, e.g. the Internet. Each client device may be a processing device owned by a respective user, e.g. a notebook, a desktop computer, a mobile phone, a netbook, a tablet-pc etc. Each client device may send a client request to the adaptive machine learning system. The client request may be submitted manually by a user operating the client device or may be automatically submitted by an application installed on the client device responsive to a specified (predetermined or predeterminable) trigger. Alternatively, the client request may be triggered at the client device by a service integration module. Each client request comprises at least a user ID and an object ID. The object ID may correspond to an object the client request is targeted to. Additionally, the client request may comprise a location and a service type. The adaptive machine learning system then transmits the client request to a parsing module.

Specifically, the parsing module of the adaptive machine-learning system parses a request database to determine further relevant data based on the user ID and the object ID transmitted with the client request. For example, the parsing module may parse the request database for determinants that are of particular relevance for the client request. Each determinant may be an attribute of a data object stored in a database. The parsing module accesses a plurality of data objects stored in the request database based on the data received with the client request, e.g. the user ID and the object ID. To do so, the parsing module may perform e.g. database joins. In a next step, the parsing module extracts the further relevant data to generate extracted data. Then, the parsing module enriches the client request with the extracted data and generates an enriched client request. Finally, based on the enriched client request, the parsing module generates a request data object for further processing by a matching module. The generated request data object is forwarded to the matching module.

Further specifically, upon receiving the generated request data object, the matching module extracts respective relevant determinants from the request data object and from further data objects stored in a response database. The request database and the response database may be at least partly the same database, for example an internal database of the adaptive machine-learning system. However, the request database and the response database may be different databases, e.g. the request database might be an internal database of the adaptive machine-learning system and the response database may be a database external of the adaptive machine-learning system. Each determinant is partly associated with a weighting. In other words, a weighting is assigned to each determinant. Each weighting may be individually assigned to represent a preference in view of each determinant. In a next step, the matching module extracts the weightings associated with the extracted determinants. Based on the extracted weightings, the matching module applies a matching algorithm on the request data object with data objects stored in the response database. In particular, the matching algorithm calculates a matching score of potential service data objects based on the extracted weightings. The matching module generates a final result based on the calculated matching score. The final result may comprise a list of service data objects having a matching score above a specified (predetermined or predeterminable) matching threshold. Finally, the final result may be provided to a learning module. The final result is at least part of the network response to the client request.

Particularly, upon receiving the final result from the matching module, the learning module applies a learning method using the final result. In particular, the learning method requires a notification from the client device and a provider device based on the final result. The provider device may be a computing device of a provider corresponding to a service data object comprised in the final result. The provider device may be e.g. a notebook, a desktop computer, a mobile phone, a netbook, a tablet-pc etc. Upon receiving a notification of the client device and the provider device, the learning module generates a learning result. The learning result may comprise a service data object comprised in the final result that was selected by the user of the client device. Finally, the learning module transmits the learning result to a learning engine.

The learning engine may adapt the matching algorithm applied in the matching module based on the learning result. In particular, the learning engine applies a boosting algorithm. The boosting algorithm is operable to adapt or modify the weightings associated with the extracted, relevant determinants in the response database. To do so, a boosting basis particularly is generated taking into account the current weightings associated with the relevant determinants. In a next step, an error is calculated for each weighting in the boosting basis. Then, a determinant with the smallest calculated error is identified and the weightings assigned to the identified determinant is updated based on the current weighting and the calculated error.

The computer network for adaptively adjusting network responses to client requests has the technical effect of providing improved, more accurate network responses to client requests. Accordingly, the amount of network traffic needed to provide client devices with network responses is significantly reduced, since network responses are continuously adapted to previous network activities between client devices, response devices and the adaptive machine-learning system. Hence, the efficiency in client-server based communication is significantly improved, since the requesting clients are provided with appropriate server responses more quickly. Moreover, the convergence of the network/server responses is accelerated.

According to another aspect, updating the weighting for the determinant is performed based on the following formulae:

$$\alpha_m = \frac{1}{2} \ln\left(\frac{1 - \frac{\epsilon_m}{W_n}}{\frac{\epsilon_m}{W_n}}\right); w_{x_i}^{(new)} = w_{x_i}^{(old)} \cdot e^{(-\alpha_m \cdot (1 - y_i))};$$

wherein $W_n$ is a sum of all weightings of the determinant, $w_i$ (specifically, $W_n$ may represent a sum of the weightings of all previous workshop choices $w_i$);
$\epsilon_m$ is a sum of weighted errors calculated for each determinant;
$\alpha_m$ is calculated for a determinant with a smallest sum of weighted errors, $\epsilon_m$, i.e. the weak learner m; and
$y_i$ is a calculated error of the determinant with the smallest calculated error, i.e. the weak learner m.

For example $w_{ij}$ may be a weighting of previous workshop choices that may be stored in the determinant workshop choice of user data objects. $w_n$ may be a sum of all weightings of the determinant previous workshop choices. As will be outlined in more detail below, $w_n$ specifically may be (later) normalized to a total of 1. Hence, it can be ensured that, when choosing the determinants, those workshop choices will be predominantly taken into consideration that are of interest at the respective point in time. The other workshop choices would consequently have lower weightings. Accordingly, with the above formula and the corresponding weightings an efficient way to process the request, particularly requiring a low processing time (and thus respective computing resources), can be achieved.

According to yet another aspect calculating the matching score comprises:
  applying a congruency analysis comprising the steps of:
    calculating a congruency degree between the request data object and each service data object stored in the response database; and
    generating a congruency list comprising all service data objects having a congruency degree above a specified (predetermined or predeterminable) congruency threshold;
  applying a user resemblance analysis comprising the steps of:
    calculating a resemblance score between a user data object corresponding to the user ID and each user data object stored in the response database; and
    generating a resemblance list comprising all service data objects associated with user data objects having a resemblance score above a specified (predetermined or predeterminable) resemblance threshold; and
  calculating the matching score for each service data object by aggregating the congruency degree and the resemblance score of the respective service data object; and
  generating the final result comprising a list of all service data objects having a matching score above a specified (predetermined or predeterminable) matching threshold.

Calculating the matching score comprises applying two operations/algorithms. The first operation is a congruency analysis. The congruency analysis comprises calculating a congruency degree between the request data object based on the generated request data object and each service data object stored in the response database. The congruency degree may be calculated based on the extracted weightings associated with at least one of the extracted determinants of the generated request data object and extracted weightings associated with corresponding determinants of each service data object. In a next step of the congruency analysis, a congruency list is generated. The congruency list may be a list of service data objects stored in the response database having a congruency degree above a specified (predetermined or predeterminable) congruency threshold.

The second operation may be applying a user resemblance analysis. Applying the user resemblance analysis comprises calculating a resemblance score between a user data object that is associated with the user ID received with the client request and each user data object stored in the request and/or response. The resemblance score may be calculated based on the extracted weightings associated with at least one of the extracted determinants of the generated request data object and extracted weightings associated with corresponding determinants of each user data object. Based on the resemblance score, a resemblance list may be generated comprising service data objects associated with user data objects having a resemblance score above a specified (predetermined or predeterminable) resemblance threshold.

Finally, the matching score may be calculated or determined for each service data object stored in the congruency list and/or the resemblance list by aggregating the congruency degree and the resemblance score of the respective service data objects. Aggregating the congruency degree and the resemblance score may comprise assigning a weighting to the congruency degree and the resemblance score and calculating the matching score based on the assigned weightings. Finally, a final result may be generated. The final result may comprise a list of those service data objects having a matching score above a specified (predetermined or predeterminable) matching threshold.

Applying the congruency analysis and the user resemblance analysis for calculating the matching score has the technical effect of providing a more accurate final result. In particular, the final result—comprising the list of potential service data objects—matches the client request more accurately, since it is generated based on the weightings assigned to the respective parameters, i.e. the congruency degree and the resemblance score. Moreover, the accuracy of the final result is further improved by taking into account parameters of both service data objects and user data objects stored in the response database.

According to yet another aspect, the computer network further comprises
  implementing each data object stored in the request database and the response database as multi-dimensional vector object, by implementing each determinant of data object as a dimension of a vector; and
  calculating the congruency degree and the resemblance score using vector comparison between the each pair data objects, respectively, by calculating the congruency degree and the resemblance score based on an angle between each pair of determinant of the respective data object.

Each data object stored in the request and response database may be implemented as a multi-dimensional vector object in a corresponding multi-dimensional vector space. Each dimension of each multi-dimensional vector object may represent one determinant of each multi-dimensional vector object. Moreover, each dimension of each multi-dimensional vector object may be assigned/associated with the weightings of the respective determinants. Accordingly, each assigned weighting may specify an impact of the corresponding dimension on the congruency degree and the resemblance score, respectively. The higher an assigned weighting is, the higher is the impact of the corresponding vector (representing a determinant) on the congruency degree and the resemblance score, respectively. Based on the multi-dimensional vector objects in the multi-dimensional vector space, the congruency degree and the resemblance score may be calculated using vector comparison. By applying vector comparison, vector similarity between each respective pair of multi-dimensional vector object may be determined. Vector comparison comprises determining the vector similarity based on an angle between each pair of vectors.

Applying the congruency analysis and the user resemblance analysis using the vector comparison has the technical effect of an excellent run-time behavior for calculating the congruency degree and the resemblance score since vector comparison is of linear complexity. Accordingly, although the request database and/or response database of the computer network may comprise a huge number, e.g. millions, of data objects implemented as multi-dimensional vector objects, vector comparison is very fast since the growth of the number of data objects stored in the request and/or response database results in a linear increase of processing time for calculating the congruency degree and the resemblance score using vector comparison.

According to yet another aspect, calculating the congruency degree comprises:
  matching hard facts in the request data object with corresponding hard facts of each service data object stored in the response database, wherein the hard facts are determinants of each data object corresponding to the object ID; and/or wherein calculating the resemblance score comprises matching soft facts in the request data object with corresponding soft facts of each user data object stored in the response database, wherein the soft facts are determinants of each data object corresponding to the user ID and may comprise one or more of:
an age of a user;
a gender of a user;
previously defined preferences of a user;
user recommendations.

Calculating the congruency degree by matching hard facts of the generated request data object with corresponding hard facts in each of the service data object stored in the response database has the technical effect of calculating a more accurate congruency degree for each service data object stored in the response database based on the hard facts, i.e. the determinants corresponding to the object ID as received with the client request. Moreover, calculating the resemblance score by matching soft facts of the generated request data object with corresponding soft facts of each user data object stored in the response database has the technical effect of calculating a more accurate resemblance score of each service data object stored in the response database corresponding to the user ID as received with the client request. Accordingly, upon aggregating the service data objects stored in the congruency list and in the resemblance list, the requesting user—i.e. the user sending the client request—is provided with a more accurate network response/final result comprising the list of service data objects that correspond more accurately to the client request.

According to yet another aspect, applying the learning method comprises the steps of:
extracting the first service data object from the final result;
parsing the extracted service data object to identify relevant data associated with the extracted service data object;
generating an acceptance query based on the identified relevant data;
transmitting the acceptance query to the client device and a provider device corresponding to the service data object;
receiving a query feedback from the client device and the provider device;
if the query feedback of the client device and the provider device is an acceptance notification:
tagging the extracted first service data object as selected service data object;
parsing the response database for relevant contract data associated with the extracted service data object;
generating a contract information notification comprising the relevant contract data; and
transmitting the contract information notification to the client device and the provider device;
if the query feedback of the client device or the provider device is a rejection notification:
generating a modified final result list by removing the first service data object from the final result; and
applying the learning method using the modified final result list.

Applying the learning method comprises extracting a first service data object from the final result. The first service data object is the service data object having the highest matching score in the final result. The extracted service data object is then parsed for relevant data associated with the extracted service data object. The relevant data may comprise e.g. a service ID, a location or contact data associated with the extracted service data object. Based on the extracted relevant data, an acceptance query may be generated and transmitted to the client device and a provider device corresponding to the service data object. Upon transmitting the acceptance query, the learning module applying the learning method receives a query feedback from the client device and from the provider device. In case both received query feedbacks are an acceptance notification, the extracted first service data object is tagged as selected service data object. Further, a contract information notification is generated and sent to the client device and to the provider device. The contract information comprises relevant contract data that is extracted by the learning module by parsing the response database. The relevant contract data may be e.g. a contact information and/or business hours corresponding to the extracted service data object; a name, an address, and/or contact information of the user data object corresponding to the user ID received with the client request. In case the query feedback of the client device and/or the provider device is a rejection notification, the learning module generates a modified final result. In particular, the learning module generates the modified final result by removing the extracted first service data object from the final result. Then, the learning module starts applying the learning method based on the modified final result list.

The learning method has the technical effect that is provides additional data/information related to the network query that may be used by the learning engine. In particular, the learning method allows for keeping track of choices related to the final result, i.e. of the selected service data object. Accordingly, the learning method allows to keep track of whether the calculated matching score corresponds to an actual choice related to the final result. The learning method labels the actually chosen service data object as selected service data object. Labeling the chosen service data object may comprise setting a corresponding flag in selected service data object. The learning module generates a learning result comprising the selected service data object and transmits the learning result to a learning engine. Based on the learning result, the learning engine is enabled to use the data stored in the final result to adapt the matching algorithm by adapting weightings assigned to relevant determinants based on the learning result. Hence the network accuracy of network responses to client requests is further improved. Since the client devices sending the client requests are provided with more accurate results, the efficiency of the computer network is further improved.

According to yet another aspect, the learning engine further comprises:
a sentiment engine operable to perform the steps of:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

After a user sent a client request, received and accepted a final result, the accepted service data object is marked as selected service data object. In a next step, the user may be prompted to provide feedback about the selected service data object. The user may provide feedback as Yes/No feedback or as free text. In case the user provides free text feedback, the sentiment engine parses the free text and identifies relevant positive or negative keywords in the received feedback, e.g. based on a corresponding library. In a next step, the sentiment engine may extract a determinant of the selected service data object that is associated with relevant keywords extracted from the free text feedback from the response database. Further, the sentiment engine extracts a weighting assigned to the extracted determinant and adapts the weighting based on the identified keywords. The adapted weightings may be stored, e.g. using a learning container associated with the user, in the response database.

Using the sentiment engine to further adapt weightings assigned to determinants in the response database has the technical effect of further improving the accuracy of network responses to client requests since the adaptive machine-learning system of the network continuously take into account user recommendations when calculating the matching score and generating the network response based on the matching score. Moreover, a collaborative improvement of network responses to client requests achieved by taking into account the user recommendations.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification. In addition, the subject matter described in this specification can also be implemented as a system including a processor and a memory coupled to the processor. The memory may encode one or more programs that cause the processor to perform one or more of the method acts described in this specification.

Details of one or more implementations are set forth in the accompanying exemplary drawings and exemplary description below. Other features will be apparent from the description, the drawings and from the claims.

BRIEF DESCRIPTION OF THE DRAWINGS

FIG. 2A shows an exemplary client request and exemplary data objects that may be stored in the request database and/or response database.

FIG. 2B shows an exemplary request data object generated from an enhanced client request.

FIG. 3 shows an exemplary framework architecture of a network for adaptively adjusting network responses to client requests to provide improved network responses.

FIG. 6 shows an exemplary application of the boosting algorithm performed by the learning engine in order to adapt the matching algorithm of the matching module based on the learning result.

FIG. 7 shows an exemplary execution of the sentiment engine of the learning engine.

FIG. 12A shows an exemplary client request, an exemplary user data object, an exemplary car data object and an exemplary owner data object.

FIG. 12B shows an exemplary potential repair data object.

FIG. 12C shows five exemplary workshop data objects.

FIG. 12D shows and exemplary selection of three workshop data objects.

FIG. 12E shows an exemplary congruency list.

FIG. 13A shows an exemplary mapping of workshop choices.

FIG. 13B shows an exemplary table of weak learners.

FIG. 13C shows an exemplary user feedback.

FIG. 13D shows an exemplary text-based user feedback.

DETAILED DESCRIPTION

In the following, a detailed description of examples will be given with reference to the drawings. It should be understood that various modifications to the examples may be made. In particular, single elements of one example may be combined and used in combination with single elements of other examples to form further examples.

To provide improved network responses to client requests, a computer network for adaptively adjusting network responses to client requests is provided. By providing the computer network for adaptively adjusting network responses to client requests, an adaptive machine-learning system continuously adapts network responses using a learning engine and hence provides more accurate network responses to client requests.

Figure 1:
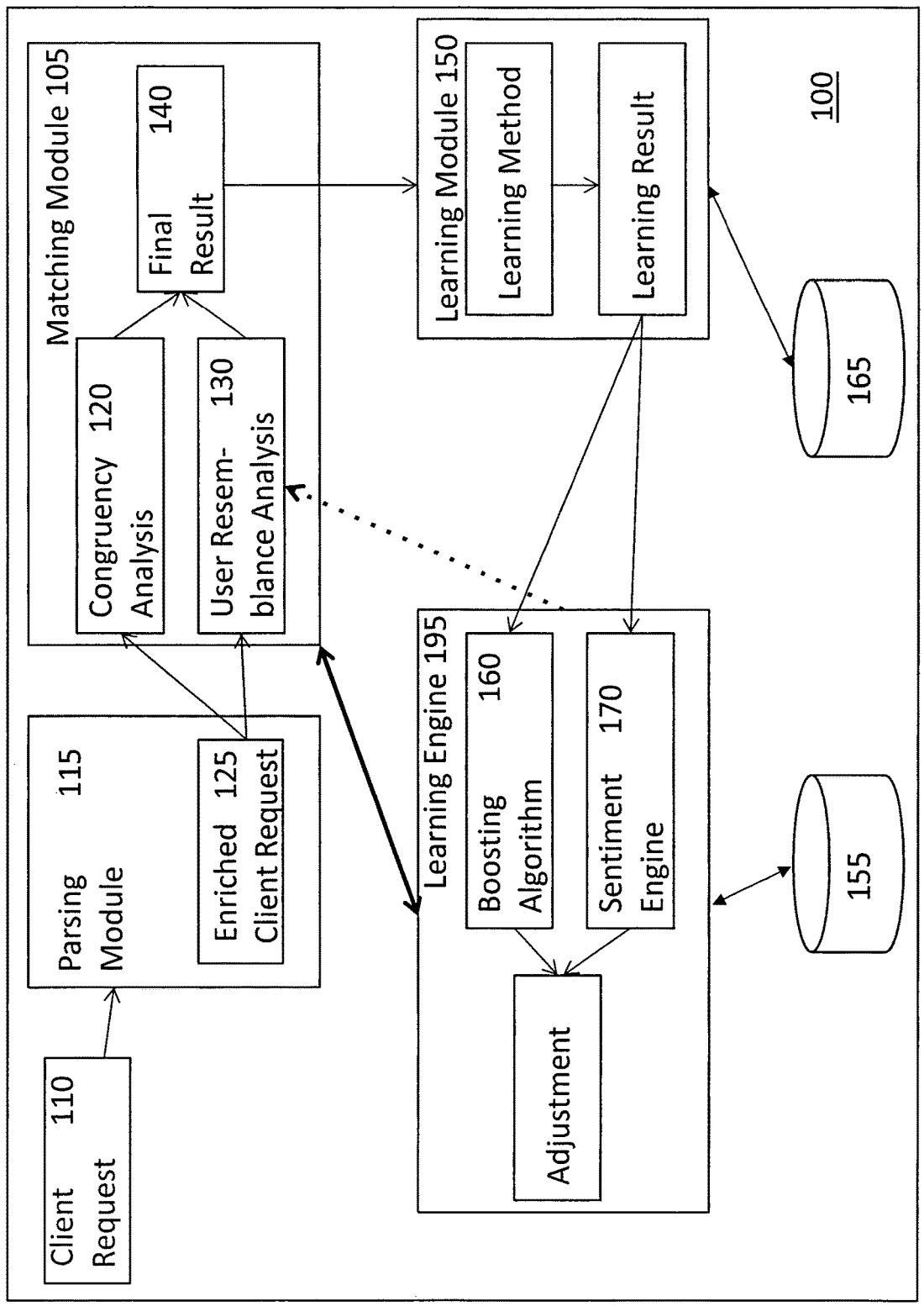
FIG. 1 shows an exemplary schematic illustration of an adaptive machine-learning system.

FIG. 1 relates to an exemplary schematic illustration of an adaptive machine-learning system 100. In particular, a client request 110, which may be herein also referred to as event and/or request is received at the adaptive machine-learning system 100 from a client device 310 (also referred herein as client). The client device 310 particularly may be a processing device owned by a user, e.g. a notebook, a desktop computer, a mobile phone, a netbook, a tablet-pc etc. Alternatively, the client device may be a third party server hosting a service. In the latter case, the user particularly owning or using the client device is in fact the user submitting a client request 110, 210 to the server. The client request 110 may be submitted manually by a user operating a corresponding client device or may be automatically submitted by an application residing in the client device based on a specified (predetermined or predeterminable) trigger. For example, the specified (predetermined or predeterminable) trigger may be a (semi-) automatic prediction of a required service event by a service integration module 1010 that may be located in the client device 310 or be external from the client device 310. The service integration module 1010 will be explained in more detail with reference to FIG. 10 below. Another example for the specified (predetermined or predeterminable) trigger may be a remote service/event prediction module located on a centralized server. Yet another example for the specified (predetermined or predeterminable) trigger may be receiving specified sensor information from sensors that may be stored in the user device sending the client request 110, e.g. data from an acceleration sensor indicating that the acceleration exceeded a specified threshold. Another example may be data from sensors that may be stored in an object corresponding to the object ID. In case the object is e.g. a car, such sensors may send data associated with fault triggers indicating any fault detected in the car. In another example, the data may be diagnostic data collected by the sensors. Accordingly, the (semi-) automatic prediction of a required service event may be triggered by the data received from the sensors.

Each client request comprises at least a user ID and an object ID. Each client request 110 may further comprise a service type, a location, and any further data necessary to process the client request. The client request 110 will be explained in more detail with reference to FIG. 2A below.

The adaptive machine-learning system 100 transmits the client request 110 to a parsing module 115. The parsing module 115 parses the client request 110 and extracts data transmitted in the client request 110. In other words, the parsing module 115 extracts the user ID and the object ID. The parsing module 115 may further extract the service type, the location, and/or any further relevant data, if submitted with the client request 110. In a next step, the parsing module 115 parses a request database 155 and/or a response database 165 to extract further relevant data based on the data extracted from the client request 110, i.e. at least based on the user ID and the object ID and optionally based on the service type, the location, and/or any further relevant data, if submitted with the client request 110. For example, the parsing module 115 may parse the request database 155 for determinants that are of particular relevance with respect to the client request 110. Each determinant is an attribute of a data object stored in the request database 155 and/or response database 165. The parsing module 155 accesses a plurality of data objects stored in the request database 155 and extracts determinants/data associated with the object ID, the user ID and optionally the service type and the location. For example, a user data object 220 associated with the user ID may be identified. In a next step, relevant determinants may be extracted from the identified user data object 220. Determinants of the user data object 220 may be a name, an address, an age, a profession, a gender, and/or user-defined preferences stored in the user data object 220. An exemplary user data object 220 will be explained in more detail with reference to FIG. 2A below. Moreover, further information may be extracted from the request database 155 and/or response database 165. For example, based on the service type as optionally received with the client request 110, a plurality of service data objects 240 may be accessed from the request/response database 155/165, respectively, that have a determinant corresponding to the service type. Further relevant data may be extracted by the parsing module 115 from the respective service data objects 240.

In a next step, the parsing module 115 may enrich the client request 110 with the extracted data to generate an enriched client request 125. The enriched client request 125 may comprise all extracted data corresponding to determinants that are relevant in view of the data submitted with the client request 110, 120, i.e. that are relevant to generate a network response to the client request 110, 120. Finally, based on the enriched client request 125, the parsing module 115 generates a request data object 230 for further processing by a matching module 105. An exemplary request data object 230 will be explained in more detail with reference to FIG. 2B below. The parsing module forwards the generated request data object 230 to the matching module 105 for further processing.

The enrichment of the client request 110, 210 has the technical effect of enabling each user operating a client device 310 to transmit a client request 110, 210 irrespective of the network coverage. In particular, since only a few amount of data, i.e. a user ID, an object ID and optionally a service type, a location and/or any further relevant parameters, needs to be transmitted with the client request 110, 210. Accordingly, the availability of the network responses generated using the adaptive machine-learning system 100 is significantly improved. Moreover, the man-machine interaction between users operating a client device 310 and the adaptive machine-learning system 100 is significantly improved.

The matching module 105 extracts respective determinants from the generated request data object 230. Each determinant is associated with a weighting. In other words, a weighting is assigned to each determinant. In a next step, the matching module 105 extracts the weightings associated with the extracted determinants. The matching module 105 further extracts the weightings associated with respective determinants of relevant data objects 240 stored in the response database 165. Based on the extracted weightings, the matching module 105 applies a matching algorithm between the generated request data object with each respective data object stored in the response database 165. In particular, the matching algorithm calculates a matching score of potential service data objects 240 based on the extracted weightings. Based on the matching score, the matching module 105 generates a final result 140. The final result 140 comprises a list of service data objects 240 having a matching score above a specified (predetermined or predeterminable) matching threshold. The service data objects 240 in the final result 140 may be stored in a descending order in view of the matching score.

Applying the matching algorithm may comprise performing two operations/algorithms. The first operation may be a congruency analysis 120 and the second operation may be a user resemblance analysis 130. The matching algorithm will be explained in further detail with respect to FIG. 4 below. The final result 140 is the network response to the client request 110, 210, and will be provided to a client device 310 sending the client request 110, 210 by the learning module 150 when applying the learning method. The learning method will be explained in more detail with reference to FIG. 8 below. Finally, the matching module 105 forwards the final result 140 to a learning module 150.

In particular, the learning method may require a notification from the client device and a provider device based on the final result 140. The provider device may be a computing device of a provider corresponding to a service data object 240 in the final result 140. The provider device may be e.g. a notebook, a desktop computer, a mobile phone, a netbook, a tablet-pc etc. Upon receiving a notification of the client device and the provider device, the learning module 150 generates a learning result. The learning result may comprise a selected service data object 240 of the final result 140 that was selected by the user operating the client device. The learning method will be explained in more detail with respect to FIG. 8 below. Finally, the learning module 150 may transmit the learning result to a learning engine 195.

The learning engine 195 may adapt the matching algorithm applied in the matching module 105 based on the learning result. In particular, the learning engine 195 applies a boosting algorithm 160. The boosting algorithm 160 is operable to adapt the weightings associated with the extracted, relevant determinants. To do so, a boosting basis is generated taking into account the current weightings associated with the relevant determinants. In a next step, an error is calculated for each weighting in the boosting basis. Then, a determinant with the smallest calculated error is identified and each weighting assigned to each identified determinant is updated based on the current weighting and the calculated error. The boosting algorithm 160 will be explained in more detail with reference to FIG. 6 below.

Adaptively adjusting network responses to client requests has the technical effect of providing improved, more accurate network responses to client requests 110, 210. Accordingly, the amount of network traffic needed to provide client devices with network responses is significantly reduced, since network responses are continuously adapted to previous network activities between client devices, response devices and the adaptive machine-learning system. Moreover, the man-machine interaction is significantly improved since the chances that each user operating a client device receives a matching network response to a client device are continuously improved.

FIG. 2A depicts an exemplary client request 110, 210. As outlined above, the client request 110, 210 comprises at least a user ID and an object ID, and may further comprise a service type, a location and/or any further data necessary to generate a network response to the client request 110, 210. The user ID may be automatically added to the client request 110, 210 by the client device. Alternatively and/or additionally, the user ID may be manually entered by a user owning or operating the client device sending the client request 110, 120. The object ID may be an identifier of an object corresponding to an object data object 250 stored in the request database 155 and/or in the response database 165. The object ID may be inserted by the user operating the respective client device 310 manually or may be e.g. read by an image module of the client device 310, e.g. by processing a Quick Response (QR)-Code. The user operating the client device 310 may request a network response in view of the object corresponding to the object ID. The service type may be a type of service the user sending the user request 110, 210 is interested in. According to one non-limiting example, in case the object ID is an identifier of a car that was involved in an accident, the service type may represent a type of repair service needed to repair the object corresponding to the object ID, i.e. the car. The location may be a location the user sending the request 110, 210 is interested in. Alternatively, the location may be a current location of the user. The user operating the client device may insert the location manually. Alternatively, the location may be automatically added to the client request 110, 120, e.g. by a Global Positioning System (GPS)-module of the client device 310. In this case, the location may be automatically determined by the client device sending the client request 110, 120 via the GPS-module. The GPS-module may capture a current position of the client device 310. As outlined above, the request may include any further data that might be necessary to generate an appropriate network response to the user request 110, 120 by the adaptive machine-learning system 100.

FIG. 2A further depicts a non-limiting exemplary user data object 220, an exemplary service data object 240, an exemplary object data object 250, an exemplary owner data object 260 and an exemplary acceptance data object 270.

In this specific example, the user data object 220 has the determinants User ID, Name, Address, Age, Gender, Contacts, Preferences, Profession, ObjectID and ServiceID. The determinant Preferences may be a preference container comprising a plurality of user-defined preferences, which will be explained in more detail in the following. The exemplary service data object 240 has the determinants ServiceID, ContactInfo, Location, ServiceType, Pricing, BusinessHours, Rating and BrandType. The exemplary object data object 250 has the determinants ObjectID, OwnerID, ObjectType, Brand, ManufacturingDate, Features, PurchaseValue and UtilityValue.

The exemplary owner data object 260 has the determinants OwnerID, Contracts, Configuration, and ObjectID. The exemplary acceptance data object 270 has the determinants AcceptanceID, RequestID, UserID, Timestamp and OwnerID. However, it is to be noted that the exemplary data objects with the exemplary determinants are not limited to this specific example but are merely for illustrative purposes.

FIG. 2B shows an exemplary request data object 230 as is generated by the parsing module 115 from the enriched client request 125. In particular, the generated request data object 230 may comprise a request ID. The request ID may be a unique identifier of the generated request data object 230 that is automatically assigned by the parsing module 115. Moreover, the request data object may contain determinants relevant for providing a network response to the client request 110. In this specific example, the request data object 230 contains two determinants extracted from the respective object data object 250 corresponding to the object ID as received with the client request 110, 210. The two determinants are the ObjectType and the ManufacturingDate of the object data object 250. The exemplary request data object 230 further contains the determinants ServiceType and the Location corresponding to the service type and location as received with the client request 110, 210. Further, the request data object 230 comprises the determinants Configuration and Contracts as extracted from the owner data object 260 corresponding to the object data object 250. Moreover, the request data object 230 comprises the determinants Address, Gender, Contacts and Profession as extracted from the user data object 220 corresponding to the user ID as received with the client request 110, 210.

FIG. 3 shows an exemplary framework architecture of a network 300 for adaptively adjusting network responses to client requests 110, 210 to provide improved network responses. In particular, the network 300 for adaptively adjusting network responses to client requests 110, 210 may comprise at least one client device 310 for generating and transmitting client requests 110, 120 via a network 340 to the adaptive machine-learning system 100. The network 340 may be the Internet, one or more intranets, or the Internet connected to the one or more intranets. Moreover, the network 300 for adaptively adjusting network responses to client requests 110, 210 may comprise at least one provider device 330 for reacting to a client request 110, 210 via the adaptive machine-learning system. In particular, the provider device may be a provider device 330 corresponding to a selected service data object 240. The selected service data object is explained in more detail with respect to FIG. 8 below. The provider device 330 may receive, from the learning module 150, when applying the learning method responsive to the client request 110, 210, an acceptance query. The provider device 330 may generate a query feedback and transmit the query feedback to the learning module 150. The learning method applied by the learning module 150 is explained in more detail with reference to FIG. 8 below. Further, the network 300 for adaptively adjusting network responses to client requests 110, 210 comprises the adaptive machine learning system 100 as explained in more detail with reference to FIGS. 1 and 4 to 12.

Figure 4:
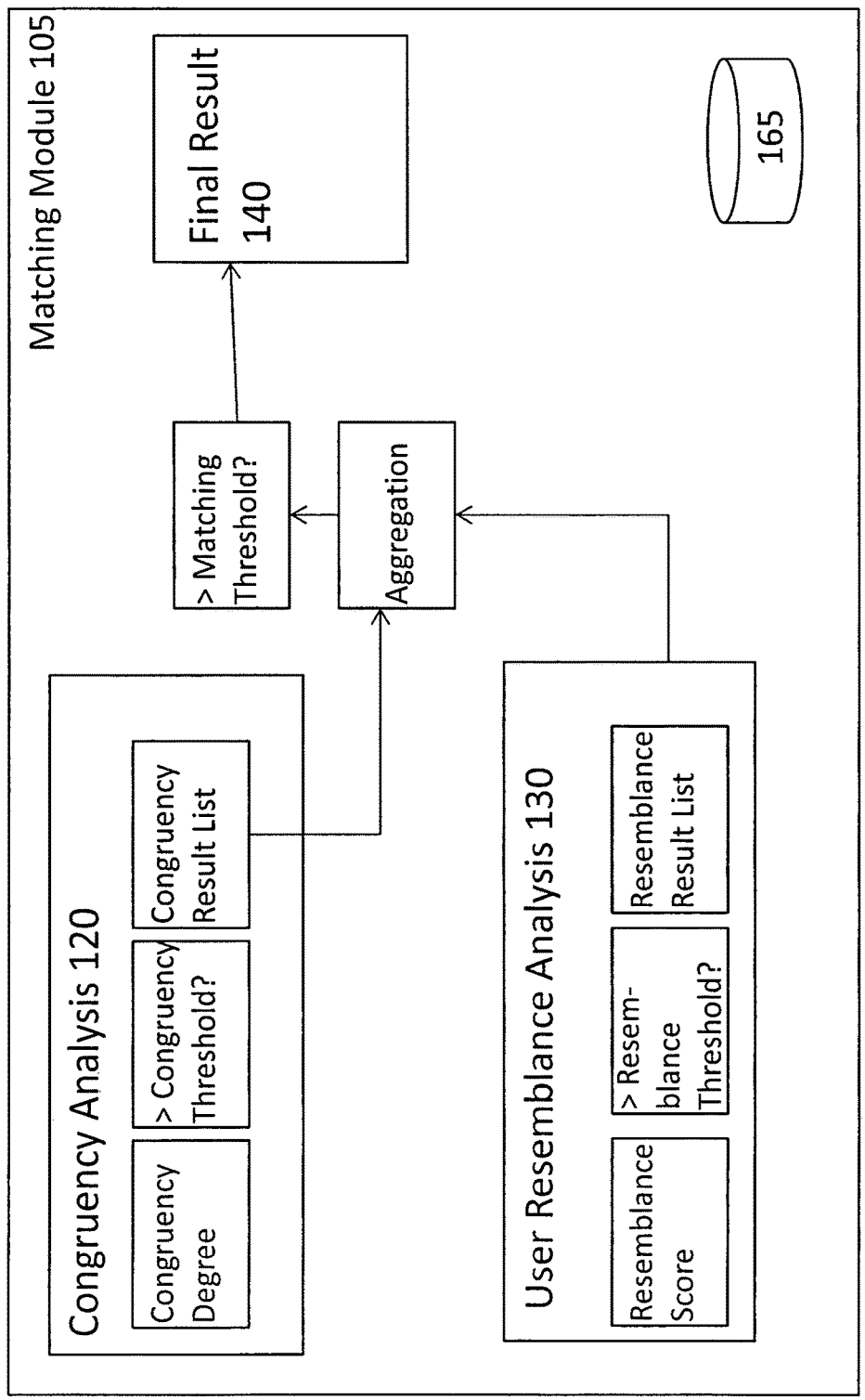
FIG. 4 shows the matching algorithm as performed by the matching module in more detail.

FIG. 4 shows the matching algorithm as performed by the matching module 150 in more detail. In particular, the matching algorithm consists of two different operations/algorithms. The first operation is a congruency analysis 120. The congruency analysis 120 may be based on hard facts. Each hard fact is a determinant that is related to the object data object 250 corresponding to the object ID as transmitted with the client request 110, 210 and stored in the generated request data object 230. With reference to the specific example data objects as explained with reference to FIGS. 2A and 2B above, the hard facts may be e.g. the ObjectType, the ManufacturingDate, the Configuration and Contracts corresponding to the OwnerID, the ServiceType and the Location.

Based on the hard facts, a congruency degree is calculated between the generated request data object 230 and each service data object 240 stored in the response database 165. In a next step, a congruency list is generated. In particular, the congruency list comprises each service data object 240 having a congruency degree above a specified (predetermined or predeterminable) congruency threshold.

Calculation Congruency Analysis 120

Calculating the congruency degree may be performed using the following formulae: The congruency analysis 120, s, may calculate each congruency degree $$S_i; S_i = \alpha(s_m(W_i, A, C, I))$$

for the generated request data object 230 and each service data object 240 stored in the response database, i=1, . . . , J based on each hard fact m being a relevant determinant. $s_m$ is a function, whereas m represents one of a set of different variations of the hard facts. Each of the determinants $W_i$, A, C, I may represent separate containers with each container being itself an aggregation of further determinants, as will be outlined in more detail below. In other words, each container may comprise a set of determinants, i.e. containers, which particularly may be thematically combined. With reference to the exemplary data objects as explained with reference to FIGS. 2A and 2B, $W_i$ may be a ServiceType of a service data object 240, i, A may be a service type as received with the client request 110, 210, C may be a container of object data objects 250 comprising an object data object 250 corresponding to the object ID as received with the client request 110, 210 In other words, the container C relates or corresponds to the unique identifier ID (e.g. 1, 2, 3, etc.) which in turn relates or corresponds to the request (e.g. relating to a vehicle) in question, so that the container C can be regarded as containing information about the request (e.g. in the example of the request relating to a vehicle, the container may contain information about age, mileage, car type of the vehicle). I may represent interactions between the hard facts, i.e. the relevant determinants, within a group of hard facts. Each group of hard facts is a group of one hard fact within each of relevant data objects and will be explained in more detail below. In other words, I is a container comprising definitions of the determinants. Hence, I is the container where the interaction between the different characteristics of the determinants are combined. The function $s_m$ may represent one of a group of congruency analysis 120 functions which may be e.g. a linear additive congruency analysis function. Alternatively, $s_m$ may be a multiplicative function or any other function that might be considered necessary and/or appropriate. The function $s_m$ is a mathematical function that assigns a numerical value to each determinant ServiceType, $W_i$, corresponding to a service data object 240 i, in view the service type as received with the client request 110, 210, A, and to the ObjectType of an object data object 250 corresponding to the object ID as received with the client request 110, 210, C. The basis of the function $s_m$ may be a utility function. The utility function may introduce weightings assigned to determinants in order to calculate a value based on the introduced weightings. For example, a determinant b may be assigned a weighting of (0.6), wherein a determinant w may be assigned a weighting of (0.4). Accordingly, the utility function may be represented by 0.6·b+0.4·w. In other words, the congruency analysis takes into account preferences in view of the hard facts by introducing weights and aggregation means of sub-parts of the function $s_m$.

Taking into account preferences in view of the hard facts has the technical effect of generating a machine-learning basis for the learning engine 195 that may change and/or adapt the weightings and the aggregations assigned to the determinants based on a learning result of the learning module 150. In particular, the preferences may be taken as input for the learning module 150 to generate a learning result which, again, is used as input for the learning engine 195 to adjust the weightings as assigned to each of the determinants. The learning method applied by the learning module 150 will be explained in more detail with reference to FIG. 8 below. The adjustment of the weightings of the relevant determinants by the learning engine 195 will be explained in more detail with reference to FIG. 7 below.

The container ServiceType, $W_i$, may itself be an aggregation of different determinants that may be represented by the following formula:

$$W_i = w(D_i, B_i, T_i^c, T_i^\alpha, P_i, R_i^i, R_i^e).$$

In view of the fact that calculating the congruency degree might be restricted, e.g. by determining specific maximum values for a specific determinant, the weighting of the ServiceType, $W_i$ may have to be aggregated. In view of the exemplary data object implementation as explained with reference to FIGS. 2A and 2B, $D_i$ might be a specified (predetermined or predeterminable) maximum spatial distance between the location as received with the client request 110, 210, and the determinant Location of a service data object 240 stored in the response database 165. $B_i$ may be the determinant Contracts of an owner. The owner may correspond to an owner data object 260 having the determinant ObjectID corresponding to the object ID as received with the client request 110, 210. The determinant Contracts may e.g. represent a base contract between the owner and one or more of service data objects 240. $T_i^c$ may represent a restriction of the determinant BrandType of the service data object 240, i. For example, the determinant BrandType of the service data object 240, i, should correspond to the determinant Brand of the object data object 250 corresponding to the object ID as received with the user request 110, 210. $T_i^\alpha$ may represent a restriction of the determinant ServiceType of the service data object 240, i. For example, the determinant ServiceType of the service data object 240, i, should correspond to the service type as received with the user request 110, 210. $P_i$ may represent a restriction of the determinant Pricing of the service data object 240, i. For example, the determinant Pricing of the service data object 240, i, should correspond to the determinant Preferences of a user data object 220 corresponding to the user ID as received with the client request 110, 210. As outlined above, each user data object 220 may comprise user-defined preferences within the determinant Preferences of the user data object 220. The determinant Preferences may be a container comprising a plurality of user-defined preferences. The determinant Preferences may comprise a pricing preference. $R_i^j$ may represent a restriction of the determinant Rating of the service data object 240, i. For example, the determinant Rating of the service data object 240, i, should correspond to the determinant Preferences of the user data object 220 (corresponding to the user ID as received with the client request 110, 210). A rating preference may be a user-defined preference as comprised the determinant container Preferences of the respective user data object 220. $R_i^e$ may represent a restriction of the user-defined rating preference as specified in the determinant container Preferences. Alternatively, the restriction $R_i^e$ may correspond to user preferences retrieved from external data source, e.g. from the Internet.

The container ObjectType C may itself be an aggregation of different determinants that may be represented by the following formula:

$$C=c(Z,E,K,T)$$

Z may be a restriction of the determinant Features of the object data object 250 (corresponding to the object ID as received with the client request). For example, the determinant Features may represent a number of damages of the object corresponding to the object data object 250 (corresponding to the object ID as received with the client request). For example, Z may not exceed a specified (predetermined or predeterminable) number of damages. E may represent a determinant PurchaseValue of the object data object 250. K may represent a restriction of the determinant UtilityValue of the object data object 250. K may be calculated using the following formula: $K=E \cdot r + E \cdot m$, wherein r may represent a specified (predetermined or predeterminable) run-time reduction represented as a percentage value and m may represent a specified (predetermined or predeterminable) usage reduction represented as a percentage value. The runtime and the usage of the object corresponding to the object data object 250 may be stored within the determinant Features. For example, K may not fall below a specified (predetermined or predeterminable) minimum threshold. T may represent a determinant Brand of the object data object 250.

In order to calculate the interactions between the containers $W_i$, A and C, a generic interaction container I is introduced. Depending on the relevant determinants as outlined above, the interaction container I may apply appropriate algorithms that may be exchanged interactively. For example, the interaction container I may comprise true/false for a determinant "car type" of an object data object corresponding to a request relating to a vehicle or car (and corresponding to the object ID as received with the client request) with respect to a determinant "offered repair car type" of all service data objects stored in the request and/or response database. Accordingly, a comparison of car types (e.g. VW, BMW and offered repair types) advantageously is possible. However, different interaction algorithms may be used depending on the respective determinant. The interaction container I has the technical effect in that it may be flexibly adjusted to any data object basis differing from the exemplary data objects as explained with reference to FIGS. 2A and 2B above and may be flexibly adjusted to any kind of interactions between relevant determinants.

As outlined above, one exemplary interaction may be the interaction between the determinant Brand of the object data object 250 and the determinant BrandType of the service data object 240. Accordingly, in case there might be a mismatch between the determinant Brand of the object data object 250 and of the determinant BrandType of the service data object 240, the interaction container I may lower a congruency value of the service data object 240 or may even set the congruency value of the service data object to 0, based on a corresponding, specific implementation of the interaction container I.

User Resemblance Analysis 130

The second operation of the matching algorithm is the user resemblance analysis 130. The user resemblance analysis 130 is based on soft facts. Each soft fact is a determinant representing user characteristics and user preferences. In the example data objects as explained with reference to FIGS. 2A and 2B above, soft facts may be one or more of the following determinants: Address, Gender, Contacts, Age, Profession and Preferences corresponding to each user data object 220.

A resemblance score is calculated between the user data object 220 corresponding to the user ID as received with the service request and each user data object 220 stored in the response database 165. In a next step, a resemblance list is generated comprising all service data objects 230 associated with user data objects 220 having a resemblance score above a specified (predetermined or predeterminable) resemblance threshold. In other words, for each user data object 220 having a resemblance score between the resemblance threshold, one or more service data objects 240 corresponding to the user data object 220 are extracted and stored in the resemblance list. Each extracted service data objects 240 are the service data objects 240 that were marked by the learning module 150 as 'selected' service data object when applying the learning method. The learning method is explained in more detail with reference to FIG. 8 below.

Calculation User Resemblance Analysis 130

Calculating the resemblance score may be performed using the following equation:

$$URA_{1,2} = \sum_{i=1}^{n} \frac{(I(U_{1,i}, U_{2,i}))^m}{\#n} \qquad (1)$$

In the following, a specific example of calculating the resemblance score is provided based on the exemplary data objects as explained with reference to FIGS. 2A and 2B. i may be a determinant corresponding to a user data object 220 as stored in the response database 165. n may represent a total number of relevant determinants of the user data object 220. I may represent the container I as introduced with formulae of the congruency analysis 120 above. $U_{1,i}$ may represent the determinant i of a first user data object 220, $U_{2,i}$ may represent the determinant i of a second user data object 220. #n may be a total number of relevant determinants. The variable m represents the parallelism of the URA 130. In other words, an arbitrary amount of URA 130 characteristics may be calculated in parallel. With increasing value of m, a low resemblance score between each pair of user data objects 220 may be penalized more a high resemblance score between each pair of user data objects 220. In other words, using parameter m in the equation, the user resemblance analysis 130, in the following:

URA 130, can be flexibly adapted to user resemblance problems. In other words, each user resemblance problem may have individual requirements to the URA 130. Based on the individual requirements, parameter m is accordingly adapted.

In the following, an exemplary calculation of a resemblance score between two user data objects 220 will be provided for illustrative purposes. In this example, m=1. The resemblance score is calculated for user data object, 220, 1 ($U_{1,i}$) and user data object 220, 2 ($U_{2,i}$) for determinant i. Moreover, container I as introduced with formulae of the congruency analysis 120 above, will be used. Accordingly, I is responsible for calculating resemblance score between $U_{1,i}$ and $U_{2,i}$. In this example, i may represent the determinant Age of $U_{1,i}$ and $U_{2,i}$, respectively. Accordingly, $I(U_{1,i}, U_{2,i})$ might be calculated as follows:

$$I(U_{1,i}, U_{2,i}) = \frac{100 - |U_{1,i}, U_{2,i}|}{100} \quad (2)$$

Accordingly, it is advantageously possible to obtain a normalized age difference of and $U_{2,i}$. It should be understood that the concept of calculating the determinant on other parameters is flexibly adjustable.

As outlined above, I is a container that is adjustable to the respective comparison to determinants as appropriate. For example, considering the determinant Preferences of $U_{1,i}$, $U_{2,i}$. As outlined above, the determinant Preferences may be a container comprising a plurality of preferences specified by the user corresponding to the user data object 220. In other words, the determinant Preference may be implemented as a preference container comprising a plurality of user-defined preferences and corresponding preference values. Each preference value may be one of a String, an Integer, a Char, a Double etc. However, each preference value within the preference container is itself a determinant i. Accordingly, for each determinant i within the preference container, I may be calculated by:

$$I(U_{1,i}, U_{2,i}) = \begin{cases} 1, & U_{1,i} = U_{2,i} \\ 0, & \text{else} \end{cases} \quad (3)$$

Alternatively, for each determinant i within the preference container, I may be calculated by:

$$I(U_{1,i}, U_{2,i}) = \frac{\#(U_{1,i} \cap U_{2,i})}{\#(U_{1,i})} \quad (4)$$

Specifically, equation 3 is preferable when fewer determinants are to be considered, whereas equation 4 is preferable when more determinants are to be considered, e.g. in order to determine the intersection when comparing the intermediate values of the containers. To continue the example, the application of equation (3) will be assumed. In the next step, the congruency degree is calculated based on equation (1).

As outlined above, each user data object 220 having a resemblance score above a specified (predetermined or predeterminable) threshold may be stored in a user list. In a next step, each service data object 240 that was marked as selected service data object (by the learning module (150) having applied the learning method, which is explained in more detail with reference to FIG. 8 below) corresponding to each user data object 220 stored in the user list, is stored in the resemblance list. Generating the resemblance list may be implemented using the following formula:

$$RS_i = \frac{\sum_{j=1}^{n} \#V_{j,i} \cdot URA_{1,j}}{\#V}$$

$RS_i$ is the resemblance score for service data object 240, i. j is the number of user data objects 220 stored in the user list. In other words, j is a counter in order to go through or iterate the results of all user data objects 220, e.g. in order to determine how often a specific service data object 240 has been chosen. $\#V_{j,i}$ is the number how often the service data object 240, i, was the selected service data object 240. $\#V$ is the total number of selected service data objects 220.

Upon calculating the resemblance score for each (potential) service data object 240, the resemblance list may be stored in the response database 165.

In particular, the resemblance list may be stored in a learning container L. The learning container L can be implemented using the following equation:

$$L_j = (w_{HF}, w_{Lj}), (LS_i)$$

$w_{HF}$ is the weighting as assigned to each of the hard facts. $w_{Lj}$ is the weighting as assigned to each of the soft facts based on the user resemblance analysis 130. ($LS_i$) is the learning score for service data object 240, (which in an example may specifically represent a learning score for workshop i). Hence, i is a counter in order to go through all service data objects 240 (which in the example may specifically represent a counter for the workshops).

Finally, the matching module 105 aggregates the congruency list and the resemblance list into a final result 140. In particular, a matching score is calculated for each service data object 240 in the congruency list and the resemblance list. To do so, the congruency degree and/or the resemblance score of each service data object 240 are aggregated. Aggregating the congruency degree and the resemblance score of each service data object 240 may be based on weightings assigned to the congruency degree and the resemblance score, respectively. Based on the calculated matching score, a final result 140 is generated. The final result 140 comprises a list of each service data object 240 having a matching score above a specified (predetermined or predeterminable) matching threshold in a descending order. In other words, the service data object 240 with the highest matching score is the first data object 240 in the final result 140.

Aggregating the congruency list and the resemblance list to generate the final result 140 comprises calculating the aggregated matching score $S_{i,j}$ for each service data object 240 stored in the congruency list and the resemblance list. In particular, calculating the matching score may be implemented using the following equation:

$$S_{i,j} = s_{HF}(w(D_i, B_i, T_i^c, T_i^\alpha, P_i, R_i^i, R_j^e), A, c(Z, E, K, T), I) + L_i$$
$$((w_{HF}, w_{Lj}), (LS_i)))$$

Based on the calculated matching score for each service data object 240 stored in the congruency list and the resemblance list, a final result 140 is generated. The final result 140 may comprise a list of each service data object 240 having a matching score above a specified (predetermined or predeterminable) matching threshold in a descending order.

Vector Comparison

The congruency analysis 120 and the user resemblance analysis 130 may be performed using vector comparison. In particular, each data object stored in the request database 155 and the response database 165 may be implemented a multi-dimensional vector object. Each dimension of each multi-dimensional vector object represents a determinant of said multi-dimensional vector object. A weighting may be assigned to each dimension of each multi-dimensional vector object.

Using vector comparison for the congruency analysis 120 and the user resemblance analysis 130 has the technical effect of an improved performance. In particular, vector comparison is of linear complexity and is therefore very fast. An increase in the number of data objects stored in the request database 155 and in the response database 165 results in a linear increase of processing time for the vector comparison in order to calculate the congruency degree and the resemblance score.

Figure 5:
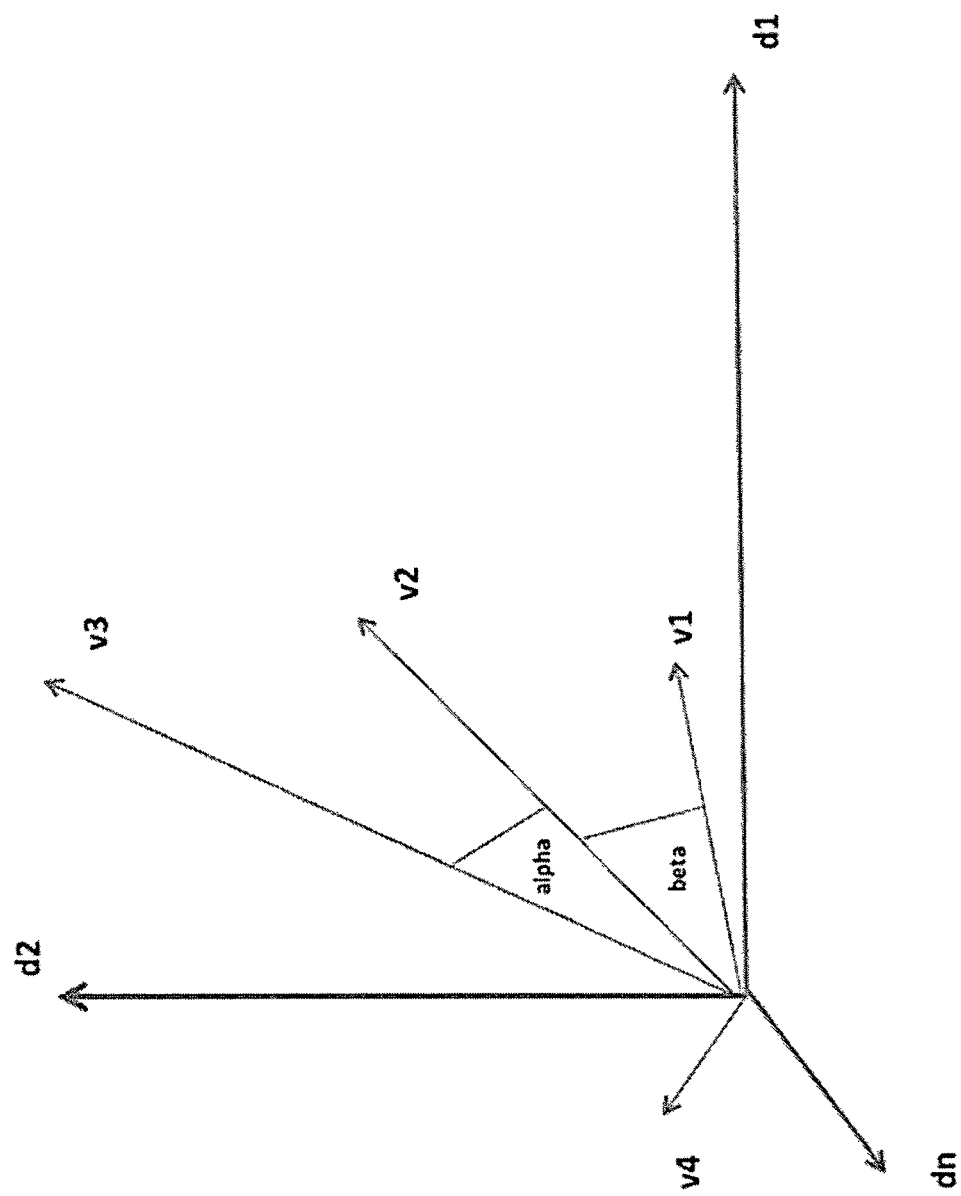
FIG. 5 shows an exemplary data object implemented as a multi-dimensional vector object.

FIG. 5 shows an exemplary data object implemented as a multi-dimensional vector object in an n-dimensional vector space. The multi-dimensional vector objects comprises four vectors v1, v2, v3 and v4. Based on this n-dimensional vector space, vector comparison is performed in order to determine vector similarity. As outlined above, each vector of each multi-dimensional vector object represents a determinant of said multi-dimensional vector object. With respect to the exemplary user data object 220 as shown with reference to FIG. 2A above, vector v1 might represent the user. ID, vector v2 might represent the Name, vector v3 might represent the Address and vector v4 might represent Preferences. Moreover, each vector, i.e. each dimension, has an assigned weighting. Each weighting of each dimension may be pre-defined or specified by the user. Each assigned weighting specifies an impact of the corresponding vector (i.e. dimension) on the congruency degree and the resemblance score, respectively. Accordingly, each assigned weighting also has an impact on the matching score that is calculated by aggregating the congruency degree and the resemblance score. In particular, the higher the assigned weighting, the higher the impact of said vector on the overall matching score.

Vector comparison is calculated based on corresponding angle alpha, beta. The smaller the respective angle between a pair of vectors v1, v2, v3 or v4, respectively, the higher the similarity between a pair of vectors v1, v2, v3 or v4, respectively.

Performing the congruency analysis 120 and the user resemblance analysis 130 using the vector comparison has the advantage of an excellent run-time behavior. In particular, the vector comparison is of linear complexity. Accordingly, even when the request database 155 and/or the response database 165 of the adaptive machine-learning system 100 may comprise a huge number, e.g. more than a million (e.g. plural millions) of data objects, the comparison is very fast since the growth of the number of data objects stored in the request database 155 and/or the response database 165 results in a linear increase of processing time when applying vector comparison to determine the congruency degree and/or the resemblance score.

The vector similarity may be calculated using a search engine such as the TREX (Text Retrieval and information EXtraction) search engine of the SAP AG. TREX is a search engine in the SAP NetWeaver integrated technology platform which is produced by the SAP AG. The TREX engine is a standalone component that may be used as an integral part of SAP products as Enterprise Portal, Knowledge Warehouse, and Business Intelligence. TREX supports various kinds of text search, including any one of exact search, Boolean search, wildcard search, linguistic search and fuzzy search. Result sets are ranked using term frequency-inverse document frequency (tf-idf) weighting, and results can include snippets with the search terms highlighted. In particular, TREX supports text mining and classification using a vector space model. Groups of documents can be classified using query based classification, example based classification, or a combination of these plus keyword management. TREX supports structured data search for document metadata for mass business data and data in SAP Business Objects. Indexes for structured data are implemented compactly using data compression. Vector comparison using TREX is performed in linear time. Accordingly, large volumes of data objects implemented as multi-dimensional vector objects in the internal database 155 and the external database 165 can be processed in linear time.

TREX supports multiple vector operations based on a vector space model and therefore approaches a vector space and a data mining feature pack for advanced algebraic analysis. TREX supports structured data search for document Metadata and for mass business data and data in SAP business objects. Its indices for structured data are implemented compactly and efficiently. Data can be aggregated and analyzed in linear time to enable large volumes of data to be processed entirely in memory. Accordingly, using TREX for vector comparison further improved the computational efficiency of the matching module 105 when performing the matching algorithm.

FIG. 6 shows an exemplary application of the boosting algorithm 160 performed by the learning engine 195 in order to adapt the matching algorithm of the matching module 150 based on the learning result. The boosting algorithm 160 is applied to each of the data object types stored in the response database 156. With respect to the specific example as explained with reference to FIGS. 2A and 2B above, the boosting algorithm 160 may be applied to the group of user data objects 220, the group of service data objects 240, the group of request data objects 230, the group of object data objects 250, the group of owner data objects; and/or the group of acceptance data objects. In the following, applying the boosting algorithm 160 is explained with reference to the group of service data objects.

In step 610, a boosting basis is generated. Generating the boosting basis comprises parsing the response database 165 and extracting all relevant determinants of each selected service data object 240 corresponding to each user data object 220 stored in the request and/or response database 155, 165. In other words, each service data object that was selected by a specific user data object 220 is extracted. Selected service data objects 240 are service data objects 240 that have been labeled as selected service data objects 240 by the learning module 150 when applying the learning method (which is explained in more detail with reference to FIG. 8 below). From each extracted determinant of each selected service data object 240, the boosting algorithm 160 determines a potential of the respective determinant. The potential of a determinant is also referred to hereinafter as 'weak learner' m. Moreover, each value within the boosting basis is an error value with respect to the weighting of each determinant.

In step 620, a summarized error is calculated for each weak learner m. Calculating the summarized error for each weak learner m comprises extracting a current value of the weighting assigned to the respective weak learner m. In case the boosting algorithm 160 is applied for the first time, the current value of the weighting may be an initial value of the weighting assigned to the respective weak learner.

For example, in view of the user resemblance analysis 130 as explained with reference to FIG. 4 above, and with reference to the exemplary data objects as explained with reference to FIGS. 2A and 2B above, the determinants Age, Gender and Preference may be considered to represent weak learners. The weak learners may be classificators. In other words, each of said determinants can be used as individual classificator for calculating the resemblance score. However, taking each classificator separately would not lead to a satisfactory result. Rather, the classificators need to be combined and a weighting needs to be assigned individually based on their relevance in view of the client request 110, 210. As outlined above, each weighting may be e.g. assigned by a user corresponding to a user data object 220 individually. Accordingly, each weighting for each classificator may be different from user data object 220 to user data object 220 as stored in the request and/or response database 165.

Updating the weightings of the determinants by the learning engine 105 has the technical effect of continuously adapting and hence improving the network responses as provided to client requests 110, 210. Updating the weightings of the determinants has further the technical effect of aggregating several values into one value and adapting the formulas, in particular the container I to provide improved network responses. Specifically, updating the weightings, however, is not only relevant for aggregating the values into one value, but for the different formulae implemented in parallel. In particular, the weightings for calculating the matching score are adjusted and additionally, the m different URA-characteristics are weighted.

The boosting algorithm 160 may be implemented using a specifically modified Adaptive Boosting, AdaBoost, algorithm which has been to meet the requirements of the learning engine 195. AdaBoost, is a machine-learning meta-algorithm. AdaBoost can be used in conjunction with many other types of learning algorithms to improve their performance. The output of the other learning algorithms, i.e. weak learners, is combined into a weighted sum that represents the final output of the boosted determinant. AdaBoost is adaptive in the sense that subsequent weak learners are tweaked in favor of the determinants that were misclassified by previous classifiers. Starting with the weak learners, as long as the performance of each learner is slightly better than random guessing, i.e. their error rate is smaller than 0.5 for binary classification, the outcome of AdaBoost converges to a strong learner.

However, other Boosting Algorithms may be used in order to further improve the network responses to client requests 110, 210. In particular, the network for adaptively adjusting network responses to client requests might be confronted with different matching challenges based e.g. on a implementation of data objects that differs from the exemplary implementation of data objects as explained with reference to FIGS. 2A and 2B above. For example, Gentle Boost may be used. Gentle Boost uses a bounded step size in comparison to other Boosting Algorithms in order to improve generalization performance. To do so the overall test error/outliers are minimized in each step rather than using a bounded step size (as conventional Boosting Algorithms would apply).

To comply with the differing requirements of the network for adaptively adjusting network responses to client requests, the boosting algorithm 160 may be implemented as an encapsulated entity in a library in an in-memory, column-oriented, relational database management system such as the HANA database of SAP. HANA is an in-memory, column-oriented, relational database management system developed and marketed by SAP SE. HANA's architecture is specifically designed to handle both, high transaction rates, and complex query processing on the same platform. In addition to the database engine, HANA includes an embedded web server and version control repository that can be used for application development. HANA applications can be created using server-side JavaScript. In particular, the boosting algorithm 160 may be implemented via the AFL-SDK (Application Function Library Software Development Kit) in HANA, in particular in the application function libraries. The application function libraries can be called in a customized way.

Applying the boosting algorithm 160 by the learning engine 195 will be exemplary explained in view of the user resemblance analysis 130. In a first step, a relevance of weak learners is determined by analyzing past, previously generated final results 140, in particular in view of the previously selected service data objects 240 (which are explained in more detail with reference to FIG. 8 below). For Example, a client device 310, sent a client request 110, 210. A user data object 220 associated with the user ID as received with the client request 110, 210, may be user data object 220, X (in the following: X). Based on said client request 110, 210, a user resemblance analysis 130 was performed (as explained in more detail with reference to FIG. 4 above). As outlined above, when performing the user resemblance analysis 130 each user data object 220 having a resemblance score in view of X above a specified (predetermined or predeterminable) resemblance threshold is stored in a user list. In this specific example, user data object 220, Y (in the following: Y) has the highest resemblance score in view of X. In a next step, the learning engine 195 parses the request database 165 and extracts each service data object 240 that was that was marked as selected service data object 240 in view of Y. In this specific example, service data object 240, Z (in the following: Z) was always marked as selected service data object 240 by Y. In case Z is the service data object 240 in the final result 140, and in case X marks Z as selected service data object 240 in view of the client request 110, 210, no updating of the weightings of the respective determinants is necessary since the first service data object 240 of the final result 140 was selected and hence the network response to the client request 110, 210 was a 'perfect match'. However, in case X marks a different service data object 240, A (in the following: A) that is not the first service data object 240 in the final result 140, the matching algorithm as applied by the matching module 105 needs to be adapted by the machine-learning module 195. In this specific example, the learning engine 195 parses the response database 165 for user data objects 220 having selected A in view of respective, past client requests 110, 210. Assuming the user data object 220, B, (in the following: B) is associated with selected A, the weightings of the respective determinants as used by the user resemblance analysis 130, i.e. the weightings of the classificators, have to be updated in favor of B. The updating of the weightings can be implemented using the following equations:

$$\epsilon_m = \sum_{y_i \neq k_m(x_i)} w_i \cdot y_i^{(m)}$$

$y_i^{(m)}$ indicates the ability of classifier m. m is a counter of all weak learners. In particular, for each weak learner m, except the weak learners that have already been processed and therefore are or represent now strong learners, $y_m$ (or $y_i^{(m)}$) is calculated to predict X's choice, i.e. the service data object 240 in the final result 140 X marked as selected service data object 240 in view of a previous client request i. All matching requests are individually weighted by $w_i$, whereas the adaptation of the weightings may be implemented using the following equations:

$$W_n = \sum_{i=1}^{k} w_i$$

$$\alpha_m = \frac{1}{2} \ln \left( \frac{1 - \frac{\epsilon_m}{W_n}}{\frac{\epsilon_m}{W_n}} \right)$$

$$w_{x_i}^{(new)} = w_{x_i}^{(old)} \cdot e^{(-\alpha_m \cdot (1 - y_i))}$$

$W_n$ is the sum of all current, individual weightings of the determinants $w_i$, $\alpha_m$ is a calculation value for weak learner m, $\epsilon_m$ is the summarized error for each weak learner; and $y_i$ is the previous value of the determinant/weak learner m times the initial weighting of the determinant/weak learner m.

FIG. 7 shows an exemplary execution of the sentiment engine 170 of the learning engine 195. The sentiment engine 170 is a feeder mechanism consisting of a Voice of Customer (VOC) language module for domain customization comprising positive/negative dictionaries that may be embedded in HANA. VOC is used in Information Technology, for example through the Information Technology Infrastructure Library (ITIL), to describe an in-depth process of capturing a client's expectations, preferences and aversions. VOC produces a detailed set of the client's requirements that may be organized into a hierarchical structure, and then prioritized in terms of relative importance and satisfaction with current alternatives. The VOC may be coupled with an interaction layer towards the user operating the client device 301. VOC may use discovered keyword dictionaries and/or profanity dictionaries to identify and classify a user's sentiments. The discovered keyword dictionaries and/or profanity dictionaries (in the following: dictionaries) may user an EXTRACTION_CORE_VOICEOFCUSTOMER configuration in HANA. The dictionaries are operable to specify named data objects or entities, in this example the object data objects 250, the user data objects 120, the workshop data objects 240, the request data objects 230 etc. as explained with reference to FIGS. 2A and 2B above. Specifying the data objects is performed using Custom Grouper User Language (CGUL) rules to identify events, e.g. a client request 110, 210, relationships, data objects, etc. CGUL rules leverage linguistic markup, core entities and custom dictionary document filters in the Natural Language Processing (NLP) engine of HANA to detect and extract text content and metadata from a user feedback, i.e. data received at the sentiment engine 270 via a feedback screen from a user operating a client device 310. In particular, the functionality of HANA may be used to apply the VOC rules using a post-processing filter mechanism. The post-processing filter mechanism is embedded in the NLP engine to extract keywords and context. Accordingly, a time of a feedback and a context to interpret the meaning of the feedback is extracted.

In view of the above, the sentiment engine 170 performs the following steps: In step 710, the sentiment engine receives free-text feedback from a user that sent a client request 110, 210 and received a network response. For example, after a user that sent a client request 110, 210, received a final result 140, he may be prompted to provide free-text feedback about the selected service data object 240, i.e. the service data object 240 that was labeled as selected service data object 240 by the learning module 150 (which is explained in more detail with reference to FIG. 8 below). The user may provide feedback as free text. In step 720, the sentiment engine parses the free text and identifies positive or negative keywords in the received feedback. For example, two sets of VOC rules may be applied for parsing the feedback: A first set of rules for identifying positive and/or negative keywords using topics and a second set of rules for identifying positive and/or negative keywords along with modifiers. Modifiers may be e.g. negations and intensifiers. The two sets of rules may be customized by the adaptive machine-learning system 100 via a dictionary. In step 730, the sentiment engine 170 extracts the positive and/or negative keywords from the feedback. For example, the post-processing filter mechanism may sort through the results of the two sets of rules and extract a final value for each Keyword/Topic/Modifier combination.

For example, the results of the two sets of rules may be:
Iam<not[happy>withmyservice].>
    happy"+\myservice"\happy"+\not";
Iam<tremendously[happy>withmyservice]:>
    happy"+\myservice"+\happy"+\tremendously";
Iam<nottremendously[happy>withmyservice]:
    happy"+\myservice\happy"+\tremendously"+\not";

Based on these results, the output, i.e. the extracted positive and negative keywords, of the post-processing filter mechanism may be:
WeakNegative;
StrongPositive;
StrongNegative;

The output, i.e. the extracted positive and negative keywords, of the post-processing filter mechanism, may be stored and maintained via a customizable dictionary in HANA. Entries in the dictionary are called by the Custom Grouper User Language (CGUL) rules, which are part of HANA. The adaptive machine-learning system 100 can add and/or remove extracted positive and negative keywords and change the positive/negative categorization of entries adaptively due to continuous feedback received from further users. Accordingly, the extracted keywords are continuously updated, such that the customer libraries and the CGUL rules are evolving over time to provide a continuously improved learning foundation for the learning engine 195. This has the technical effect of further improving the accuracy of the network responses to client requests 110, 210.

In step 740, the sentiment engine extracts respective determinants of the selected service data object 240. Respective determinants are determinants that are affected by the extracted keywords from the feedback. In step 750, a weighting assigned to each extracted determinant is extracted. In step 760, the extracted weightings are adapted based on the extracted keywords. Finally, the adapted weightings are stored in the response database 165.

Using the sentiment engine to further adapt weightings assigned to determinants in the response database has the technical effect of providing more accurate network responses to client requests since the adaptive machine-learning system of the network may continuously take into account user recommendations when calculating the matching score and generating the final result based on the matching score.

Figure 8:
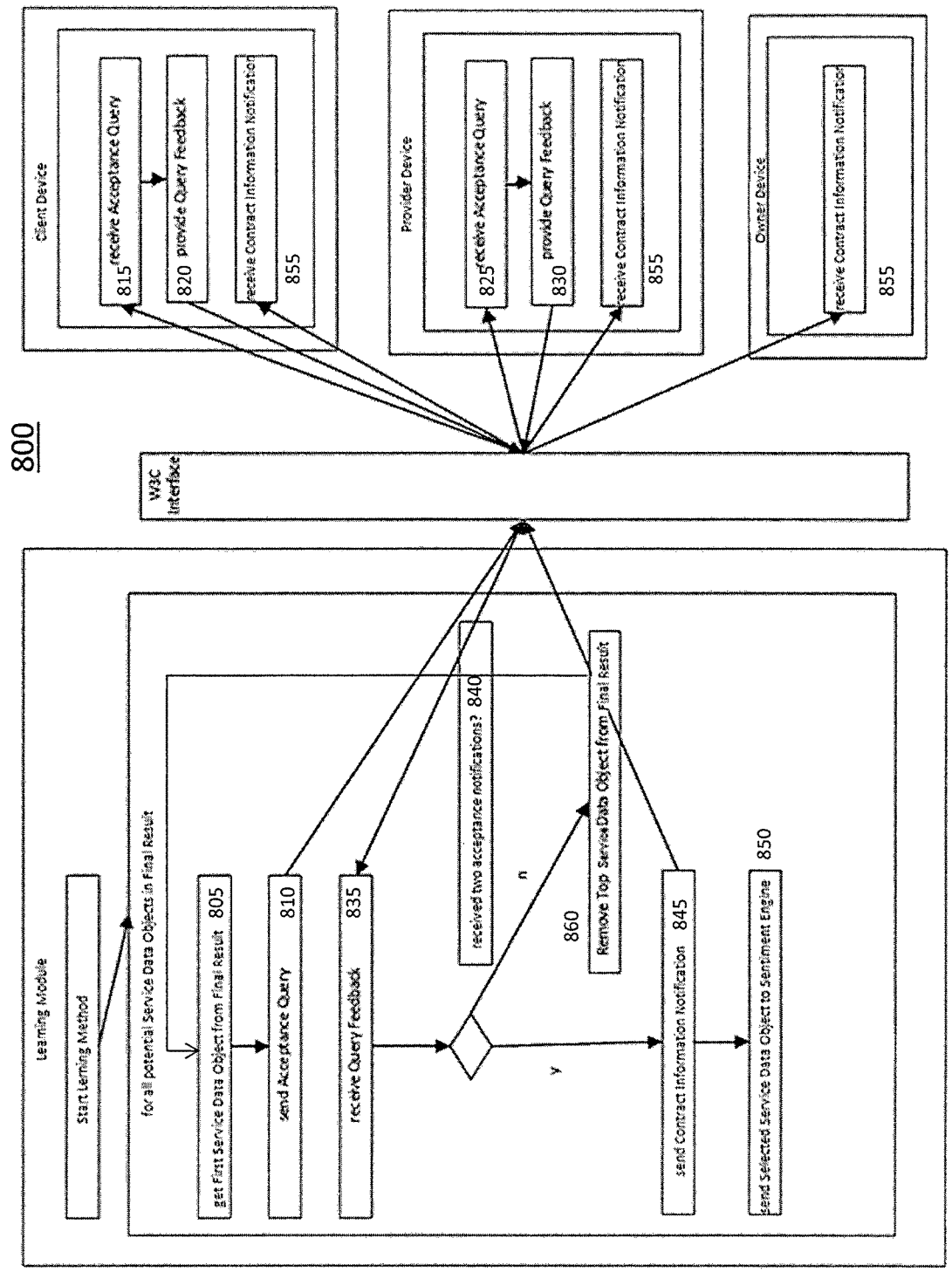
FIG. 8 shows the learning method as performed by the learning module.

FIG. 8 shows the learning method as performed by the learning module 150 upon receiving the final result 140 from the matching module 105. In a first step 805, the first service data object 240 is extracted from the final result 140 by parsing the final result list 140. As outlined above, the first service data object 240 is the service data object having the highest matching score. In step 510, an acceptance query is generated. In particular, the first service data object 240 is parsed to identify relevant data associated with the extracted/first service data object 240. Relevant data associated with the first service data object 240 may be relevant determinants necessary to provide the client device 310 and a provider device 330 corresponding to the extracted service data object 240 with relevant data. In view of the specific example as provided with reference to FIG. 2A above, the relevant determinants may comprise one or more of the following: Location, ServiceType and Rating of the extracted service data object 240, Preferences of the user data object 220 corresponding to the user ID as transmitted with the client request 110, 210, ObjectType and Features of the object data object 250 corresponding to the object ID as transmitted with the client request 110, 210.

Based on the extracted relevant data, the learning module 150 generates an acceptance query. In step 810, the acceptance query is sent to the client device 310 that transmitted the client request 110, 210. In step 815, the client device 310 receives the acceptance query from the learning module 150. In step 820, the client device generates a query feedback responsive to the acceptance query and sends the query feedback to the learning module 150. In step 825, the provider device 330 receives the acceptance query from the learning module 150. In step 830, the provider device 330 generates a query feedback responsive to the acceptance query and sends the query feedback to the learning module 150. In step 835, the learning module receives the query feedback from the client device 310 and the provider device 330. The query feedback of the client device 310 and/or the provider device 330 may be an acceptance notification. Each acceptance notification indicates that the user operating the client device 310 and the user operating the provider device 330, respectively, accepts the service corresponding to the extracted service data object 240. Moreover, the query feedback of the client device 310 and/or the provider device 330 may be a rejection notification. Each rejection notification indicates that the user operating the client device 310 and/or the user operating the provider device 330, respectively, does not accept the service corresponding to the extracted service data object 240.

In step 840, the learning module determines whether both, the query feedback of the client device 310 and the query feedback of the provider device 330 are acceptance notifications. If both, the query feedback of the client device 310 and of the provider device 330, are acceptance notifications, it is continued at step 845. In particular, the learning module 150 marks the extracted first service data object 240 as selected service data object 240. Marking the first service data object 240 as selected service data object 240 may comprise setting a corresponding selected service flag in the selected service data object 240. Moreover, the learning module 150 parses the request and/or response database 155/165 and extracts relevant contract data associated with the extracted service data object 240. Based on the extracted relevant contract data, the learning module 150 generates a contract information notification comprising the relevant contract data. In the specific example as outlined with reference to FIG. 2A above, relevant contract data may be one or more of the determinants: ContactInfo, and the BusinessHours of the extracted service data object 240, Name, Address, and Contacts of the user data object 220 corresponding to the user ID as transmitted with the client request. The learning module sends the contract information to the client device 310, the provider device 330 and optionally to an owner device. The owner device may correspond to the owner data object 260, wherein the owner data object 160 may correspond to the determinant OwnerID of the respective object data object 250. In step 855, the client device 310, the provider device 330 and optionally the owner device receive the contract information notification. Finally, the learning module 150 generates a learning result. The learning result comprises the extracted service data object 240 that is marked as selected service data object. The learning module 150 transmits the learning result to the learning engine 195.

If the query feedback of the client device 310 and/or the query feedback of the provider device 330 is a rejection notifications, it is continued at step 860. In particular, the learning module 150 modifies the final result 140. Modifying the final result 140 comprises removing the extracted first service data object 240 from the final result 140.

Then, the learning module 150 continues with step 805, using the modified final result 140.

The learning method of the learning module has the technical effect of providing, with the learning result, a learning basis for the learning engine 195 to flexibly adjust the weightings assigned to the relevant determinants based on the learning result. Accordingly, the network responses to client requests are further improved.

Figure 9:
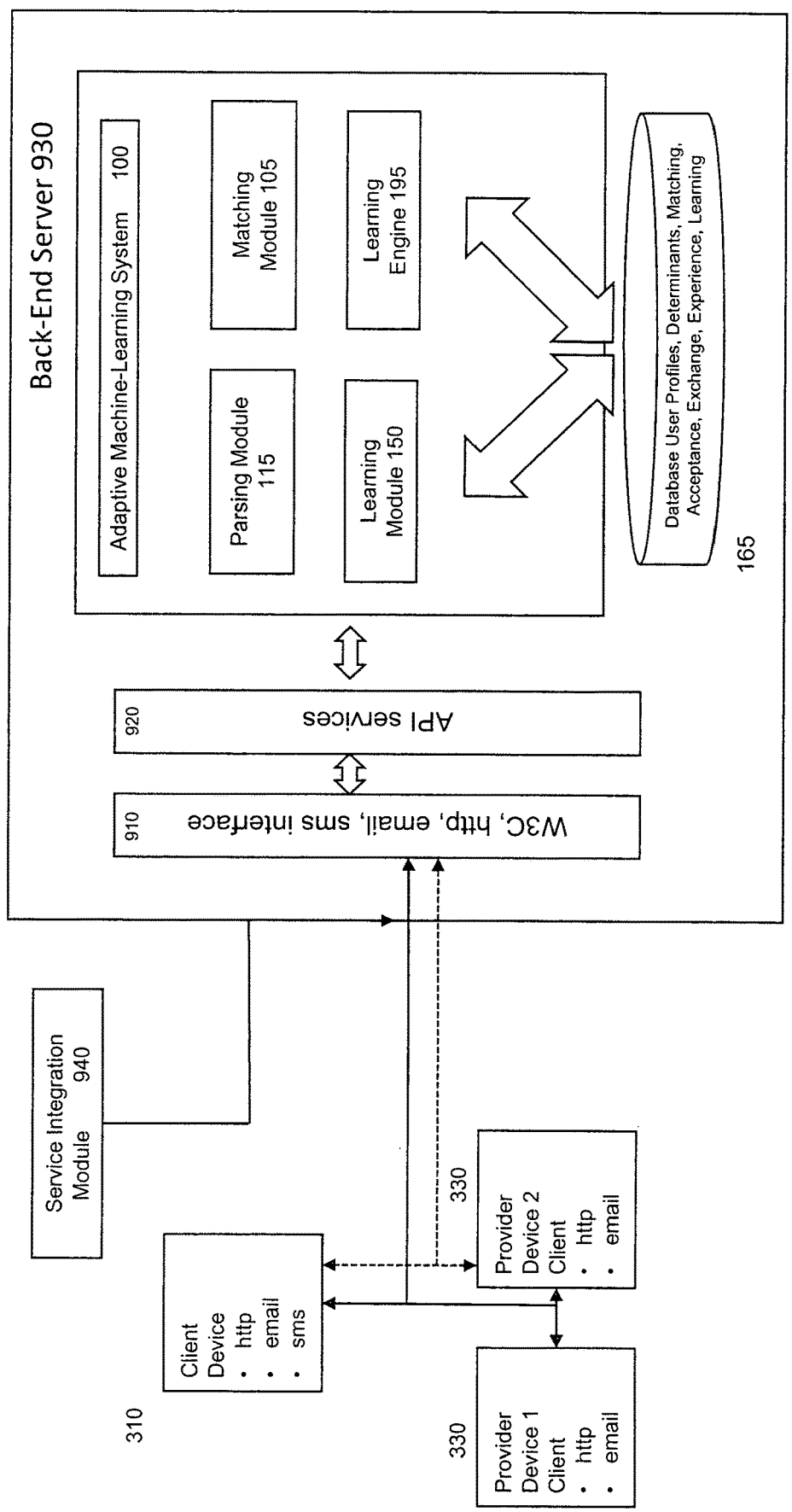
FIG. 9 shows an exemplary architecture of the computer network for adaptively adjusting network responses to client requests.

FIG. 9 shows an exemplary architecture 900 of the computer network for adaptively adjusting network responses to client requests 110, 210. The adaptive machine-learning system 100 may be hosted on a back-end server 930. The back-end server 930 may be accessible via a World Wide Web Consortium (W3C) web service interface 910 and a corresponding Application Programming Interface (API) 920. W3C is the main international standards organization for the World Wide Web and enforces compatibility and agreement among World Wide Web application providers by adopting standards defined by the W3C. The adaptive machine-learning system 100 comprises service modules. The service modules may be the parsing module 115, the matching module 105, the learning module 150 and the learning engine 195. The service module may access the back-end server 930 via the W3C web service interface 910 and the API services 920.

Each client request 110, 210 may be sent by the corresponding client device 310 to the adaptive machine-learning system 100 via the W3C web service interface. Optionally, the client request 110 may be submitted (semi-) automatically upon prediction of a required service event by a service integration module 1010. The service integration module 1010 will be explained in more detail with reference to FIG. 10 below. The network response may be returned via the W3C web service interface 910 which may be based on the eXtensible Markup Language (XML) and the Simple Object Access Protocol (SOAP).

Using this communication technology has the technical effect of an improved machine-to-machine communication. The service integration module 1010 may provide the client request 110, 210 to the adaptive machine-learning system 110 via the W3C web service interface 910 and may receive the network response via the W3C web service interface 910 or alternatively via a different web service interface.

Additionally and/or alternatively, the client request 110, 210 may be submitted using different communication technologies, e.g. via a Short Message Service (SMS). Sending the client request via SMS has the technical advantage of an improved man-machine-interaction and improved operability of the adaptive machine-learning system 100 since users operating e.g. an old mobile phone lacking a network card, where using the W3C web service interface 910 is inappropriate, may still request network responses by submitting client requests 110, 210 via SMS.

Additionally and/or alternatively, a task application may be installed on one or more client devices 310. To do so, a service integration module 1110 may be installed on the one or more client devices. The service integration module 1110 installed on the one or more client devices 310 is explained in more detail with reference to FIG. 11 below. In this particular example, the one or more client devices 310 may submit the client request 110, 210 to the W3C web service interface 910 via the service integration module 1110. The service integration module 1110 is operable to receive a plurality of service requests, aggregate the received service request and forward the aggregated service requests to the service provider/server providing the service. The task application installed on the client device may be any task or event management application integrated with a calendar application.

Figure 10:
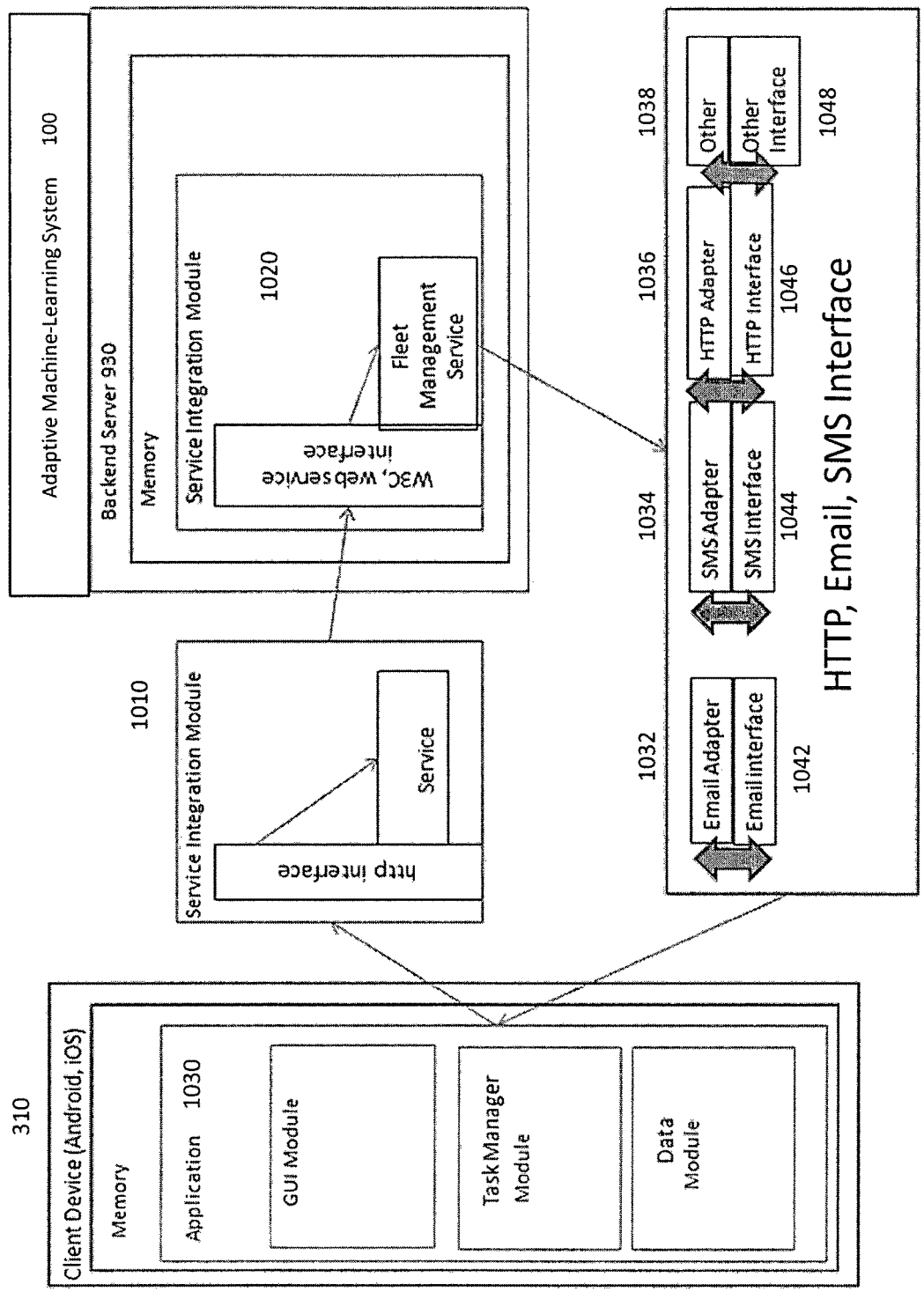
FIG. 10 shows another exemplary architecture of the computer network for adaptively adjusting network responses to client requests.

FIG. 10 shows another exemplary architecture 1000 of the computer network for adaptively adjusting network responses to client requests 110, 210. The adaptive machine-learning system 100 may be hosted on a back-end server 930. The back-end server 930 may be accessible via the W3C web service interface 910 and corresponding API services 920. The network result responsive to the submitted client request 110, 210 may be submitted from the adaptive machine-learning system 100 to the client device 310 via an e-mail to a task application 1030 installed on the client device 310 of a user operating the client device 310. The network response generated by the adaptive machine-learning system 100 can be submitted to the client device 310 via a plurality of common communication technologies, e.g. SMS, W3C web services, e-mail, etc. In particular, the network response may be transformed with corresponding adapter software modules 1030, e.g. an e-mail adapter module 1032, a SMS adapter module 1034, an HTTP adapter module 1036, or any other appropriate adapter module 1038, into the respective data format necessary for the respective communication techniques. Each adapter module 1030 may comprise program routines for data exchange with the adaptive machine-learning system 100 hosted on backend server 930. Moreover, respective interfaces of the adapter modules are provided, i.e. an e-mail interface 1042, a SMS interface 1044, an HTTP interface 1046 and any other interface 1048 corresponding to the other appropriate adapter module 1038 interfaces. The data exchange between the interfaces 1042, 1044, 1046, 1048 and their corresponding adapter modules 1032, 1034, 1036, 1038 is illustrated with double-arrows. Additionally and/or alternatively, the W3C web service interface 910 can be used for the data exchange between the client device 310 and the adaptive machine-learning system 100.

The adaptive machine-learning system 100 may further comprise a registry (not shown). The registry is a data structure for mapping a particular client request 110, 210 received by a client device 310 to a corresponding adapter software module 1032, 1034, 1036 and 1038. The registry further comprises information necessary to send the network response to the client device using a preferred interface 1042, 1044, 1046, 1048. For example, for each client request 110, 210 that comprises a mobile phone number, the preferred interface may be defined to be the SMS interface 1044 corresponding to the SMS adapter 1034. According to another example, for each client request 110, 210 comprising an e-mail address, the preferred interface may be defined to be the e-mail interface 1042 corresponding to the e-mail adapter 1032. Accordingly, upon receiving a client request 110, 210, the adaptive machine-learning system may map the service to a particular adapter module 1032, 1034, 1036 and 1038 by specifying a new entry in the registry connecting the client request 110, 210 with a preferred adapter software module 1032, 1034, 1036 and 1038 according to specified (predetermined or predeterminable) rules.

Upon generating the network response to the client request 110, 210, the network response may be returned via push technology to the preferred adapter software module 1032, 1034, 1036 and 1038 as specified in the registry. Upon receiving the network response, the respective adapter software module 1032, 1034, 1036 and 1038 generates a message according to the communication technology supported by the adapter software module 1032, 1034, 1036 and 1038. The message comprises the network response transformed in the respective data format. The message is then forwarded to the corresponding interface 1042, 1044, 1046, 1048. The interface transmits the generated message to the client device 310.

Additionally and/or alternatively, each client device 310 may have a calendar application installed. The calendar application may be able to submit a client request 110, 210 to the adaptive machine-learning system 100 hosted backend server 930 directly or indirectly via one or more of the interfaces 1042, 1044, 1046, 1048 (see above). As outlined above, each client device 310 may be e.g. a mobile phone, a processing devices such as a notebook, a desktop PC or a third party server, a navigation device or a smart phone. Each navigation device may be a mobile phone having installed thereon a task application and further comprising a software component for providing GPS-based navigation assistance.

Each client device 310 may further be able to communicate via the W3C web service interface 910. In other words, each client device 310 can submit a client request 110, 210 to the W3C web service interface 910 of adaptive machine-learning system 100 hosted on the back-end server 930 directly and receive the network response via the W3C web service interface 910.

The interfaces for submitting the client request 110, 210 and receiving the network response may correspond to each other. Submitting the client request 110, 210 to the W3C web service interface 910 and receiving the network response via the W3C web service interface 910 may be implemented as synchronous or asynchronous data exchange.

Figure 11:
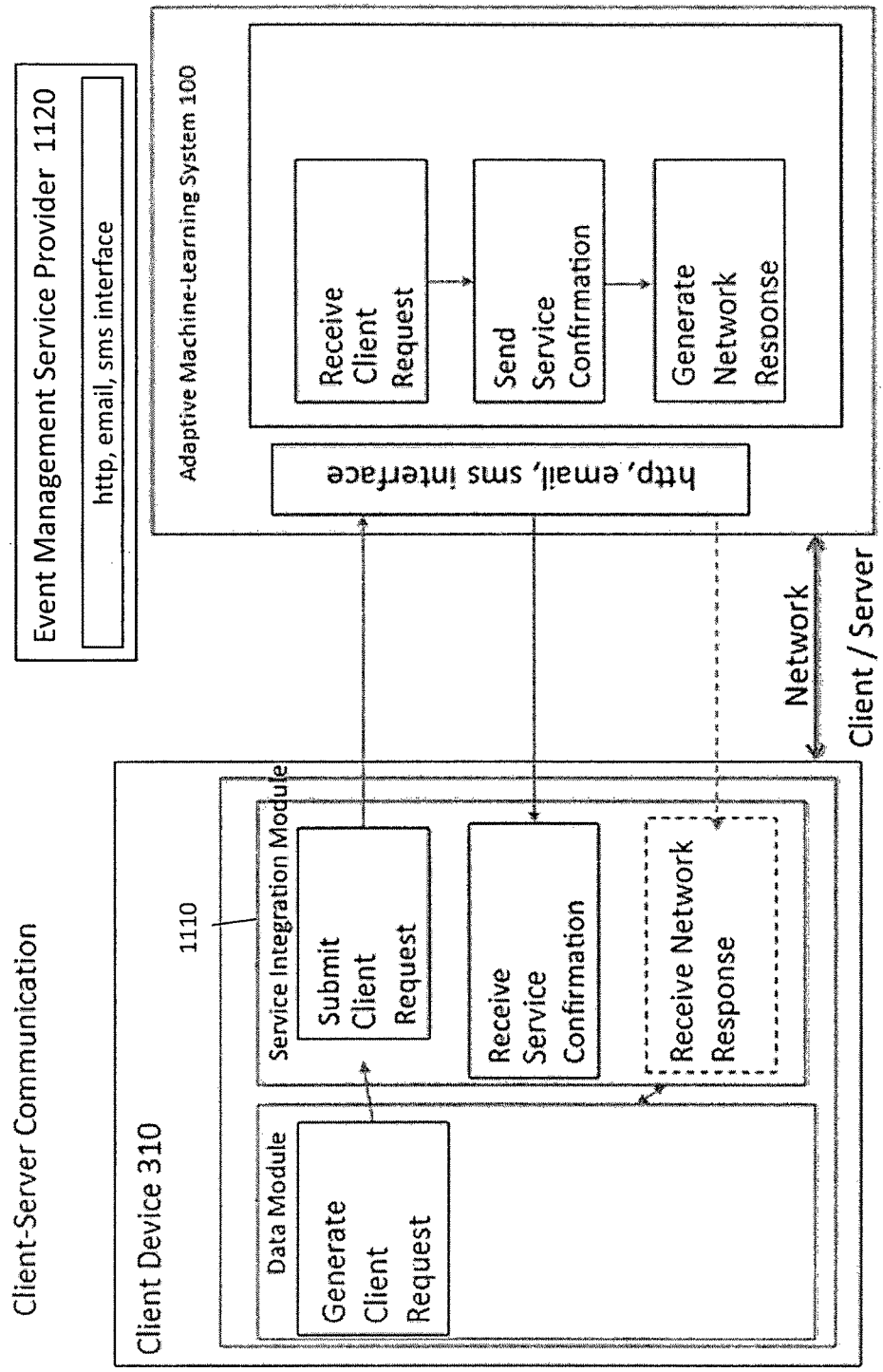
FIG. 11 shows an exemplary communication between a client device, an event management service provider and the adaptive machine-learning system.

FIG. 11 shows an exemplary client-server communication between a client device 310, an event management service provider 1120 and the adaptive machine-learning system 100.

In this specific example, the client request 110, 210 submitted by the client device 310 may comprise additional data. The additional data submitted with the client request 110, 210 may prompt the adaptive machine-learning system 100 to return a result to the client device 310 using a request notification e-mail. Alternatively, the additional information may be stored in a user data object 220 corresponding to the user ID as received with the client request 110, 210 in the request database 155 and/or the response database 165. In case the adaptive machine-learning system 100 is able to detect an appropriate provider corresponding to a service data object 240 stored in the response database 165, a corresponding network response may be submitted to an e-mail adapter 1032 hosted on the backend-server 930 corresponding to the adaptive machine-leaning system 100. The e-mail adapter 1032 may extract the data stored in the network response and generate a corresponding request notification e-mail comprising the extracted data of the network response (i.e. in the appropriate data format). The request notification e-mail may be returned via a corresponding e-mail interface 1042 to an e-mail address of the user operating the client device. The e-mail address may be stored in the user data object 220 corresponding to the user operating the client device 310. Alternatively, the e-mail address may be submitted with the client request 110, 210.

Alternatively and/or additionally, the client request 110, 210 is automatically triggered by a client request event management service 1120 provider (in the following: event management service 1120). The event management service 1120 may be installed on a remote server. Alternatively, the event management service 1120 may be installed on the backend server 930 hosting the adaptive machine-leaning system 100. The event management service 1120 may include an interface, e.g. an HTTP interface. The HTTP interface may be an HTML page hosted on the remote server and may be accessible to the client devices 310 via the World Wide Web. The HTTP page may be presented as an HTML-based graphical user interface (GUI) by a browser installed on the respective client device 310. The HTML page may comprise an HTML form. A user operating a client device 310 may complete the HTML form and submit the HTML form to the event management service 1120. Upon submission of the HTML form, the execution of event management service 1120 may be triggered. The execution of the event management service 1120 may result in a reservation or an ordering of a service offered by a provider corresponding to a service data object 240 stored in the internal database 155 or in the external database 165 of the adaptive machine-learning system 100. The reservation is associated with the client device that submitted the completed HTML form.

In the following, a specific example of the event management service 1120 is provided. A user operating a client device 310 may access the event management service 1120 using an HTML-based GUI via a browser. The browser may be installed on the client device 310. The client device 310 may be e.g. a notebook or desktop PC of the user. The client device may be connected to the server (i.e. the remote server hosting the event management service 1120) via a network 340, e.g. the Internet. In other words, the user may access the HTML-Page provided by the event management service 1120 via the browser. The user may then select an event/service which may be a service he is interested in. For example, the user may be provided via the GUI with means for selecting a service (in the following: service) 'inspection'. The management service 1120 may use the adaptive machine-learning system to provide the selected service 'inspection'. The means for selecting the event may comprise a corresponding checkbox or radio button.

Upon selecting the service, the client device 310 may submit an HTTP request via the network 340 to the HTTP interface 1046 of the event managing service 1120. The event management service 1120 may process the HTTP request according to its particular implementation.

Upon processing the user selection of the service 'inspection', the event management service 1120 may submit a service request 1130 to W3C web service interface 910 of the adaptive machine-learning system 100 hosted on the back-end server 930. The service request 1130 may comprise at least a desired starting time, a location and a pre-negotiated contract detail of the service requested by the user. For example, a pre-negotiated contract detail may include automatically providing a rental car in case of a car accident or a defined cost item level for tire changes.

The location of the service request may represent a location of a workshop providing the user-selected service, i.e. the inspection. The inspection may be a car inspection planned by the user. The desired starting time may be a latest acceptable inspection time. Alternatively, the service request may further comprise a location of departure which may be a current location of the user. The location of departure might be submitted by the user via additional GUI elements when completing the form.

The adaptive machine-learning system 100 may extract the data from the service request 1130. Based on the user ID submitted with the service request 1130, the adaptive machine-learning system 100 may compare the user data object 220 corresponding to the user ID and each other user data object 220 stored in the response database 165 that requested the same service, in this example the service 'inspection'. In case at least one user data object 220 requested the same service and a determinant car preferences (which may be stored in the container Preferences of the at least one user data object 220) is similar to the determinant car preferences of the requesting user, the adaptive machine-learning system may generate a corresponding response submit it to the client device. In particular, the generated response may be a service response notification e-mail. Accordingly, responses of other users are taken into consideration when generating the response specifically in view of the fact that at least one user may have similar preferences and/or may have requested the same service. Accordingly, the results of the adaptive machine-learning system advantageously are influenced by the responses, thus leading to a more accurate result while implying a reduced processing load to compute the result. The generated response may be submitted via the back-end server 930 hosting the adaptive machine-leaning system 100 to the server hosting the event management service 1120. The server hosting the event management service 1120 may comprise multiple interfaces and corresponding adapters as explained with reference to FIG. 10 above, i.e. an e-mail interface 1042 and a corresponding e-mail adapter 1032, an SMS interface 1044 and a corresponding SMS adapter 1034. Some interface/adapter pairs may alternatively be hosted on an external server, e.g. in order to improve the performance of the server hosting the event management service 1120. Each adapter software module 1032, 1034, 1036 and 1038 is operable to receive generated response. The generated response may be processed and formatted according to the requirements of the communication protocol used to forward the generated response to the client device 310. The formatted generated response is then forwarded by the respective adapter module 1032, 1034, 1036 and 1038 to its corresponding interface 1042, 1044, 1046 and 1048 and transmitted to the client device.

In other words, the generated response can be submitted to the client device 310 using various communication technologies comprising SMS, W3C web services and e-mail the corresponding adapter software modules 1032, 1034, 1036 and 1038 may process the generated response according to the respective appropriate format necessary for the respective communication technology. Each adapter software module 1032, 1034, 1036 and 1038 comprises program routines for data exchange with the adaptive machine-learning system 100 hosted on the backend server 930, the corresponding interfaces 1042, 1044, 1046 and 1048 and the W3C web service interface 910.

In one example, each user data object stored in the internal database 155 and/or in the external database 165 may have a user-defined determinant for specifying how the network response and/or the generated response should be transmitted to the corresponding client device 310 interface. For example, this specification may depend on a time span between the point in time of generating the generated response and a starting time of the requested service. For example, a user-defined specification may comprise receiving the generated result via an e-mail one day before the starting time of the service. Additionally and/or alternatively, a user-defined specification may comprise receiving the generated result via SMS one hour before the starting time of the requested service.

According to another example, each service provided by the adaptive machine-learning system 100 can be integrated into a task application running a client device 310. In this example, the client device 310 is a notebook. For example, a service integration module can be installed on the client device 310. The service integration module 1110 can submit a client request 110, 210 to at least one of the interfaces 1042, 1044, 1046, 1048 of the adaptive machine-learning system 100.

In another example, the service request 1130 may be submitted from the service integration module 1110 installed on the client device 310 to one of the interfaces 1042, 1044, 1046, 1048 of the event management service 1120. In this case, the generated response may be returned via the same respective interface 1042, 1044, 1046, 1048, to the service integration module 1110. The service integration module 1110 may create and/or modify a service request 1130 in a task manager. The service request 1130 may be submitted from the service integration module 1110 installed on the notebook to one of the interfaces 1042, 1044, 1046, 1048 of the event management service 1120. According to the settings of the user-defined specification, the user operating the notebook may prefer receiving the generated response via email. In case a matching service was found and could be allocated successfully to the client device 310 by the event management service 1120, the generated response is submitted to the e-mail adapter 1032 of the event management service 1120. The e-mail adapter 1032 creates a service e-mail comprising the generated result and transmits the generated service e-mail to the task application 1110 installed on the laptop. The task application 1110 generates an event corresponding to the generated result received with the service email.

According to a further example, a service request 1130 is submitted from a service integration module 1110 installed on client device 310 that is in this example a mobile phone to the SMS-interface 1044 of the event management service 1120. According to the settings of the user-defined specification, the user operating the mobile phone may prefer receiving the generated result via e-mail. In case a matching service was found and could be allocated successfully to the client device 310 by the event management service 1120, the generated response is submitted to the e-mail adapter 1032 of the event management service 1120. The e-mail adapter 1032 creates a service e-mail comprising the generated result and transmits the generated service e-mail to the task application 1110 installed on the mobile phone. The task application 1110 generates an event corresponding to the generated result received with the received service email.

According to yet another example, a web site comprising a GUI is provided by the event management service 1120. A user operating a client device may specify a service request 1130 directed to the event management service 1120 by submitting a respective completed HTML form comprising user-defined specifications on a requested event/service. The HTTP-based service request 1130 is sent to an HTTP interface 1.046 of the event management service 1120. The HTTP interface 1046 generates a corresponding service request, which is submitted from the event management service 1120 the W3C web service interface 910 of the adaptive machine-learning system 100. According to the settings of the user-defined specification, the user may prefer receiving the generated result via e-mail. In case a matching service is found and could be allocated successfully to the client device 310 by the event management service 1120, the generated response is submitted to the e-mail adapter 1032 of the event management service 1120. The e-mail adapter 1032 creates a service e-mail comprising the generated result and transmits the generated service e-mail to the task application 1110 installed on the client device 310 of the user. The task application 1110 generates an event corresponding to the generated result comprised in the received event/service email.

The service integration module 1110 is operable to integrate an event management service 1120 into a task application. Using the service integration module 1110 has the technical advantage that required service requests 1120 can be automatically detected and/or generated. In addition, entering and specifying a service request 1120 via a GUI is facilitated. This has the technical advantage of an improved man-machine interaction. Features such as the mapping of tags to unequivocal addresses are highly beneficial in the context of services helping to organize services/events but may be unnecessary in case a different repair service is integrated. This has the technical advantage of a facilitated matching of reoccurring events and of a facilitated allocation of supplies. Accordingly, the respective result can be computed in a more efficient manner particularly leading in some instances to a reduced amount of resources needed for the computation. Moreover, a client device-based allocation of providers 330 providing a requested service is enabled.

According to yet another example, the client device-based allocation of providers, e.g. repair workshops, is executed by a provider allocation program that may be installed on client devices 310. The provider allocation program may comprise one or multiple machine-machine interfaces 1042, 1044, 1046, 1048 enabling respective devices, 310, 330, 930, 1120, to exchange data over a network 340, e.g. the Internet, using e.g. a mobile telephone connection or any other technology suitable for exchanging data over the network 340. The provider allocation program may prompt a user operating a client 310 to accept or reject a suggested service request via a GUI. Each user operating a client device 310 having installed the provider allocation program may specify in a corresponding user profile whether he wants his position to be tracked during a service process corresponding to the service/entity requirements. For example, in case a user notably deviates from his current position or in case a user has concerns about providers that have no rating available e.g. in the Internet, the tracking option may help the user ensuring that an appropriate provider may be found in a specified (predetermined or predeterminable) distance to his current location. The tracking functionality requires the client device 310 to comprise means to determine the current position of the client device. For example, a suitable client device 310 may be a mobile phone comprising a GPS-module. The adaptive machine-learning system 100 may receive the position data from the client device 310 and store the received position in the request database 155 and/or the response database 165. The position data may be deleted from the request and/or response database 155/165 once the respective user has been detected to have reached the location of the provider 330.

The adaptive machine-learning system 100 may further comprise a second tracking functionality by tracking the position of client devices 310 currently requesting an service corresponding to a provider. In case the position of the client device 310 significantly deviates from a previously determined route to a location of the provider, an alarm may be issued to ensure that client device 310 is not moved by theft.

The provider allocation program installed on a client device 310 facilitates the use of the adaptive machine-learning system 110. Hence, the man-machine interaction is further improved. The provider allocation program is operable to communicate with the adaptive machine-learning system 100. The provider allocation program manages four distinct lists of data objects representing predicted, published, arranged and past services. In other words, the provider allocation program manages a predicted services list, a published services list, an arranged service list and a past services list.

The data objects are referred to accordingly as predicted, published, arranged and past service data objects 240. Each service data object 240 comprises at least a specification of a starting and an arrival time of a service, of a location of service, a location of an event, e.g. an accident, a pre-negotiated contract and of estimated repair costs.

The predicted services list that comprises predicted service data objects is only stored on the respective client device 310. Predicted service data objects can be service data objects predicted by the service integration module 1110 installed on the client device.

A predicted service data object can also be created manually by the user operating the client device, e.g. via a GUI provided by the provider allocation program. As outlined above, the predicted service data objects are only stored on the client device 310 and are not known to the adaptive machine-learning system 100. For example, in case the user plans a tire service but is not sure if he will be able to take that service at the specified day, he may define the repair data object in advance. The main function of the predicted service list is to act as a container for user-planned services for which still some relevant data is missing, e.g. a place of service, or when the planned service is not guaranteed to take place at all.

Possible user actions on the predicted service data objects are: create, delete, edit and publish. The publication of a predicted service data object is equivalent to moving the respective predicted service data object to the published service list comprising published service data objects. Moving a particular predicted service data object from the predicted service list to the published service list triggers the submission of a service request 1130 to the adaptive machine-learning system 100. The service request 1130 may comprise the service specifications (as outlined above) of the predicted service data object. The published service data object is stored by the adaptive machine-learning system 100 in the request database 155 and/or the response database 165. The adaptive machine-learning system 100 extracts the service specifications corresponding to the published service data object and further specifications corresponding to the user profile of the user that submitted the service request to create a potential service data object. Said potential service data object may be used by the adaptive machine-learning system 100 in a next step in order to execute a mapping and a matching service. The mapping service may parse the request database 155 and/or the response database 165 for user data objects 220 that have preferences similar to the preferences of the user data object 220 corresponding to the user that submitted the service request 1130. In addition, the matching service determines whether the user profile of the user that submitted the service request 1130 and determinants of potential service data objects 240 match/correspond to each other, e.g. with respect to the user-defined service preferences (that may be stored in the determinant Preferences of the user data object 220). In case a plurality of user data objects 220 match with the user data object 220 corresponding to the user that submitted the service request 1130, the matching profiles are automatically assigned to the corresponding service data object 240. Accordingly, a matching result is generated. The matching result comprises the service data objects 240 best matching to the user that submitted the service request 1130. The matching result may be transferred via a second order service request to the e-mail adapter 1032 of the adaptive machine-learning system 100. The e-mail adapter 1032 may create a meeting request/notification task comprising the e-mail address of the client that submitted the service request 1130 in a recipient's field. The meeting request/notification task may be sent via email to a task manager of the client device 310 via a task manager interface, resulting in an update of the task manger of the client device. The updated task manager comprises a new service event comprising an arrival time, a location of the service and the user specifications with respect to one or more providers 330 providing the respective service.

The published service list comprises published service data objects 240 and is stored on the client device 310. As the specifications corresponding to each published service data object are submitted as published service request to the adaptive machine-learning system 100 upon publication of potential service data objects on the backend-server 930, the data contained in the published service list is also present on the backend server 930. A predicted service data object does not necessarily have to be created based on the predicted service list. However, a published service data object is created for each published service data object in the published service list. Each published service data object may be created automatically or manually by the user. A generated published service data object is automatically submitted to the adaptive machine-learning system 100 in the form of a published service request. On the backend-server, the published service request triggers crating a request data object 230 and the execution of the matching method. The request data objects 230 corresponding to the published service list can be created, edited or deleted. Any action upon said published service data objects will be automatically submitted to the adaptive machine-learning system 100 in the form of a published service request.

The service integration module 1110 may automatically predict and create the published service data objects corresponding to the service data objects in the published service list. The service integration module 1110 has read and write access to a service application and to predicted and published service list of the provider allocation program. In case the service integration module 1110 predicts a required service, the service integration module 1110 may create a predicted request data object or a corresponding published request data object.

If the service integration 1110 module creates a predicted service data object based on the predicted service list, the user has the option to review the "prediction result" and to publish the predicted service manually. In case the service integration module creates a published request data object 230 from a published service data object 240 in the published service list, a corresponding published service request is submitted automatically to the adaptive machine-learning system 100. The service integration module 1110 may be implemented as 'plug-in' or 'add-in' for different smart phone operating systems (OS).

Additionally and/or alternatively, the service integration module 1110 can be implemented as an independent service program being registered as event listener with an event of an event application or the groupware server of the event application. The service integration module 1110 can also be implemented as an independent service program updating task list. Since the service integration module 1110 needs to be interoperable with each task application or task groupware server, respectively, the implementation details of the service integration module depend on the type and version of the task application, e.g. on a particular version of the task manager applications (e.g. Lotus Notes, smart phone Apps).

The provider allocation program may be implemented as event listener listening for the creation of events in a task application that may be installed on the client device 310. For example, if the user of the client device 310 specifies a new event, the repair manager software automatically creates a predicted service data object 240 in the predicted service list.

The arranged serviced list may be stored in the backend-server 930 and in the client device 310 and may comprise arranged service data objects. In case the provider allocation program determines at least one matching potential service data object and in case the corresponding matching user data object could be successfully allocated to the user of the client device 310 comprising the provider allocation program, an arranged service data object is created by the service sharing service and stored in the request and/or response database 155, 165. The corresponding published service data objects on the server side are supplemented with a pointer to the arranged service data object in the arranged service list. The arranged repair data objects are also supplemented with at least two pointers to their at least two respective published service data objects corresponding to the user and the at least one service provider.

The arranged service data object is similar but not identical to the published service data object it is derived from: for example, the user and the provider have specified via a published service data objects a location frame and a service scenario (e.g. software update) wherein each of them was willing to take the service. On the other hand, arranged service data objects comprise the starting and the end time of the actual service. The specifications of the arranged service are submitted by the adaptive machine-learning system 100 to the client device 310, resulting in the creation of an arranged service data object in the arranged services list stored on the client device 310 and on the request and/or response database 155, 165 of the adaptive machine-learning system 100 and a deletion of the corresponding published service data object in the published service list. The arranged service data objects of the arranged service list can be edited, deleted or used to contact the allocated provider by the user of the provider allocation program.

The past services list comprises past service data objects. After the service time according to the specifications of the arranged service data object is reached, the corresponding arranged service data object is moved from the arranged service list to the past service list comprising past service data objects. This movement is executed by the provider allocation program installed on the client device and also on the backend server 930. A user may select a past service data object to provide feedback information on the provider corresponding to the past service data object or to contact said provider. The past service may be moved from the past service list to a separate entity after three months. The separate entity may serve as one learning basis the sentiment engine 170.

The provider allocation program and the service integration module 1110 may be implemented as one single piece of software unifying the capabilities and functions of both software modules. The provider allocation program may be implemented as software running on an Android and/or iOS operating system. The provider allocation program may be further operable to manage the communication between each client device 310 and the backend-server 930 during the automatic and/or semi-automatic service allocation process. The provider allocation program may further manage the communication between two client devices 310, e.g. in the automatic and/or semi-automatic client device-based allocation of service providers. To provide said communication functionalities, the provider allocation program may comprises an appropriate interface for exchanging messages with the backend-server of the adaptive machine-learning system 100 and with other instances of the provider allocation program that may be installed on other devices.

Example Implementation

In the following, an implementation example for the processing of the client request 110, 210 in the computer network for adaptively adjusting network responses to client requests 110, 210 to provide improved network responses using the adaptive machine-learning system 110 is provided. However, the subject-matter is not limited to this specific example. Rather, this example is for illustrative purposes for the processing of the request 110, 210 in accordance with the system with reference to FIGS. 1 to 8 above.

The adaptive machine-learning system 100 may be executed by a server of a fleet management service provider. The server may be a remote server, e.g. a backend sever 930, hosting the fleet management service provider (including the adaptive machine-learning system 100).

A client device 310 may submit a service request 110, 210 to the adaptive machine-learning system 100 of the fleet management service provider (in the following: system 100). The service request 110, 210 may comprise data enabling the system 100 to create and specify a request data object 230. As outlined above, each client request 110, 210 comprises at least a user ID, an object ID which may be in this specific example a car ID, a service type which may be in this example an accident type, and a location which will be in this example an accident location where a car corresponding to the car ID may have had an accident. As outlined above, the client request 110, 210 may be submitted automatically by a software program installed on the client device 310 sending the client request 110, 210. The software program may be a service integration module 1110 as explained in detail with reference to FIG. 11 above. For example, the client device may receive sensor type data from a care indication about an accident that happened and a type of the accident. A care indication may be or correspond to a reoccurring event, e.g. a repair/check event. The service integration module 1110 of the client device 310 may predict an accurate service type based on the sensor type data. In this specific example, the service type may be a repair type corresponding to the car accident. The service integration may 1110 submit the client request 110, 210.

In a next step, the client request 110, 210 may be received by the system 100. The system 100 may comprise multiple web service interfaces for receiving client requests 110, 210 and return corresponding network responses in accordance with the client-server paradigm. The web service interfaces are explained in more detail with reference to FIG. 10 above. The client request 110, 210 may be an XML based web client request 110, 210, a client request 110, 210 e-mail or a client request 110, 210 SMS (as explained with reference to FIGS. 9 and 10 above).

Upon receiving the client request 110, 210 at the system 100, the client request 110 210 is submitted to the parsing module 115. The parsing module 115 may extract the data from the client request 110, 210 that is necessary to create a potential repair data object 230 (i.e. the request data object 230). In a next step, the parsing module 115 may map data extracted from the client request 110, 210 with the request database 155 and/or the response database 165 to generate an enriched client request 125. The enriched client request 125 may in this specific example comprise a location of accident (as submitted with the client request 110, 210), a name of the user operating the client device 310, an address of the user, user-defined preferences (as extracted from a user data object 220 corresponding to the user ID as received with the client request 110, 210), an accident type (i.e. the service type as submitted with the client request 110, 210), a desired starting time of repair (as may be specified by the user operating the client device 310), a car brand, a car mileage, a car manufacturing date, a car accident history and a car owner corresponding to an owner data object 260 (as extracted from a car data object 250 corresponding to the car ID as received with the client request 110, 210). In this specific example, the car owner is a fleet manager owning the system 100. Further, a contact information of the fleet manager 260, configurations of the fleet manager 260 which in this example might be specific configurations of the fleet manager 260, e.g. pre-negotiated contracts with workshops or a minimum utility value of the car to be repaired, are extracted.

In a next step, an enriched request data object 230 (i.e. an enriched potential repair data object) may be generated from the enriched client request.

In this specific example, the client device 310 that sent the client request 110, 210, has installed thereon the service integration module 1110. As outlined above, the client request only contains minimum amount of data and is enriched by the parsing module 115 as explained above. Moreover, a time for handling the client request 110, 210 may be specified by the user operating the client device 310. For example, a value 0 indicates that the client request 110, 210 is to be handled 'as soon as possible', whereas a value greater than 0 indicates the client request 110, 210 can be handled by the fleet manager. The location can be entered automatically by the client device's GPS module or entered manually by the user operating the client device 310. The user ID is be entered automatically by the service integration module 1110 since the user is automatically logged in. The service type, in this specific example the repair type, can be chosen manually by the user operating the client device 310. Alternatively, the repair type may be identified automatically by corresponding data received from the car. Accordingly, the repair type can be filled out automatically. The car ID is a unique identifier of each car and may be previously defined by the fleet manager owning the car. In this specific example, each car may have a Quick Response (QR)-code attached, so that the user operating the client device may use a camera module integrated in client device to read the QR-code. The so extracted car ID can be entered automatically to the client request 110, 210 by the service integration module 1110. Table 1 shows a client request for this specific example:

TABLE 1

| Exemplary Client Request 110, 210 | |
|---|---|
| Client Request | 110, 210 |
| User ID | 123 |
| Car ID | 456 |
| Location | Street 1 |
| Repair Type | Motor |
| Time | 0 |

The enrichment of the client request 110, 210 to generate the enriched client request 125 may comprise applying database joins on the respective data objects. FIG. 12A shows the enrichment of the client request 110, 210.

Based on the enriched client request 125, the potential repair data object 230 is generated. FIG. 12B shows an exemplary potential repair data object. The potential repair data object 230 that is generated from the enriched client request 125 is then submitted to the matching module 105. As explained with reference to FIG. 4 above, the matching module 105 executes the matching algorithm comprising the congruency analysis 120 and the user resemblance analysis 130. The exemplary calculations are based on the formulae as explained with reference to FIG. 4 above.

As outlined with reference to FIG. 4 above, the congruency analysis comprises calculating a congruency degree between the potential repair data object 230 and each service data object 240 stored in the response database 165. In this specific example, each service data object 240 is a workshop data object 240. Moreover, in this specific example, the response database 165 comprises 5 workshop data objects. The exemplary 5 workshop data objects are shown in FIG. 12C.

As explained above, each owner corresponding to an owner data object 250 may specify within the determinant Configurations specific criteria that each service data object 240 has to correspond to, which may be called deal-breaker criteria. In this specific example, the car owner is the fleet manager owning the system 100. In this specific example, the fleet manager has specified in the determinant Configurations one deal-breaker criteria, which reduces the workshop data objects 240 to be further examined to a total of three workshop data objects 240. The reduced set of workshop data objects 240 is shown in FIG. 12D. Accordingly, congruency analysis 120 needs only to be performed for the remaining workshop data objects 1, 2 and 3.

For the reduced set of workshop data objects 240, congruency analysis 120 is applied based on relevant determinants. For this specific example, the following determinants are of relevance: Distance, ExternalRecommendations (External Rec), Internal Recommendations (Internal Rec), CarType, RepairType and Pricing. Table 2 shows this exemplary determinants of the workshop data objects 240 for the reduced set of workshop data objects 240 (WS1, WS2 and WS3) and the respective values.

TABLE 2

Determinants and Respective Values

| Determinants | WS 1 | WS 2 | WS 3 |
|---|---|---|---|
| Workshop Data Objects | | | |
| Distance | 30 | 20 | 15 |
| External Rec | 0.4 | 0.3 | 0.2 |
| Internal Rec | 0.2 | 0.1 | 0.3 |
| Car Type | any | BMW | any |
| Repair Type | any | motor | any |
| Pricing | 0.3 | 0.2 | 0.1 |

Moreover, in this specific example, a utility value of each the car corresponding to the car data object 250 in question (i.e. having the car ID as submitted with the client request 110, 210) is calculated. Table 3 shows the exemplary car data object 250 with its exemplary determinants and corresponding values.

TABLE 3

Exemplary Car Data Object

| Accident Type | motor |
|---|---|
| Car Data Object 250 | |
| Number of Accidents | 2 |
| Utility Value | 14000 |
| Purchase Value | 20000 |
| Time Reduction | 0.1 |
| Mileage Reduction | 0.2 |
| Type | BMW |

For the car data object 250, the utility value is calculated using the following formula:

$$(1-r-m)*E$$

wherein E is the purchase value, r is a specified (predetermined or predeterminable) run-time reduction, in this specific example the time reduction based on the car's age, and m is a specified (predetermined or predeterminable) usage reduction in this specific example the mileage reduction based on the car's mileage. The utility value in this specific example is $(1-0.1-0.2)*20000=14$.

In order to achieve an overall-comparability, each value of each determinant needs to be normalized. This may be done using into account a maximum value and a minimum value for each determinant using the following formula:

$$\frac{(MaxValueDeterminant - MinValueDeterminant) - |(ActualValueDeterminant - MinValueDeterminant)|}{(MaxValueDeterminant - MinValueDeterminant)}$$

The scale of external recommendation can be 0 and 1 and be defined based on the interest (so that it is possible to easily compare all determinants in the normalized space).

Using the above formula for the exemplary determinant Distance of WS2, the normalized value will be:

$$\frac{(30-15)-|20-15|}{(30-15)} = 0.67$$

Applying the above formula for normalization for each determinant in Table 2, the normalized values for each determinant of each workshop data object 240 are shown in Table 4.

TABLE 4

Exemplary Normalized Determinants

| Determinants | WS 1 | WS 2 | WS 3 |
|---|---|---|---|
| Workshop Data Objects | | | |
| Distance | 0 | 0.67 | 1 |
| External Rec | 1 | 0.5 | 0 |
| Internal Rec | 0.5 | 0 | 1 |
| Car Type | any | BMW | any |
| Repair Type | any | motor | any |
| Pricing | 1 | 0.5 | 0 |

The calculation of the congruency degree of the potential repair data object 230 and each of the remaining workshop data objects 240 (WS1, WS2 and WS3) will be described in the following for workshop data object 1 (WS1).

As explained above, each user corresponding to a user data object 220 may have user-defined preferences in the determinant Preferences. Accordingly, each user data object 220 has an individual weighting container describing his preferences. In this specific example, each determinant has the same weighting. The Determinant Group "Workshop", i.e. the sum of all determinants of WS 1 has a total value of 0.625, which is calculated as follows:

$$0.25 \cdot 0 + 0.25 \cdot 1 + 0.25 \cdot 0.5 + 0.25 \cdot 1 = 0.625$$

The Determinant Group "Interactions" which comprises the determinants CarType and AccidentType has a total value of 0.5, which is calculated as follows:

$$0.5 \cdot 0.5 + 0.5 \cdot 0.5 = 0.5$$

In this example, WS 1 is compatible with each car type and each repair type. Therefore, WS 1 has a value of 0.5 for the determinants CarType and RepairType, whereas WS 2 has a perfect match in view of the determinants CarType and RepairType and therefore a value of 1.

Now, the Determinant Groups "Workshop" and "Interactions" are aggregated into the congruency degree as follows:

$$0.5 \cdot 0.625 + 0.5 \cdot 0.5 = 0.5625$$

The respective values for the above calculations for the congruency analysis 120 are shown in Table 5.

TABLE 5

Values and Weightings of Determinants WS 1

| Determinants | Weightings | WS 1 |
|---|---|---|
| Workshop | 0.5 | 0.625 |
| Distance | 0.25 | 0 |
| External Rec | 0.25 | 1 |
| Internal Rec | 0.25 | 0.5 |
| Car Type | | any |
| Repair Type | | any |
| Pricing Type | 0.25 | 1 |
| Interactions | 0.5 | 0.5 |
| Car Type | 0.5 | 0.5 |
| Accident Type | 0.5 | 0.5 |
| Matching | | 0.5625 |

Analogously, the congruency degree for WS 2 and WS3 can be calculated, resulting in the congruency degree for WS 2=0.70875 and WS 3=0.5625. FIG. 12E depicts the congruency list for the workshop data objects 240 WS 1, WS 2 and WS 3.

In a next step, the user resemblance analysis 130 as part of the matching algorithm is applied. In this specific example, three user data objects 230 (User 1, User 2, User 3) are stored in the request database 155 and/or response database 165, which are shown in FIG. 12F.

The calculation of the resemblance score will be explained on the example of User 2.

The gender of each user data object 220 as well as any further binary determinants (e.g. Preferences), are set to 1 in case of an accordance/match and to respectively no accordance/no match. The normalization of the determinant Age using normalization value 100 is calculated as follows:

$$\frac{100 - |30 - 60|}{100} = \frac{70}{100} = 0.7$$

Moreover, each determinant has a weighting assigned to it. In this specific example, each determinant has the same weighting assigned to it, i.e. 1/7.

Accordingly, a resemblance score for the determinant Age of User 2 is $$\frac{0.7}{7} = 0.1.$$

Following this exemplary calculation, Table 6 shows each resemblance score for each determinant as well as the total resemblance score (URA Score) for the user data object 220 corresponding to the user ID as received with the client request 110, 210 (Req. Send.) and each user data object 220 (i.e. User 1, User 2 and User 3):

TABLE 6

Exemplary Resemblance Score

|  |  | Req. Send. | User 1 | User 2 | User 3 |
|---|---|---|---|---|---|
| Preference | Name | Peter Pete | Julia Vas | Heinz Sili | Lothar Evsky |
| Container | Sex | m | w | m | m |
|  | Age | 30 | 25 | 60 | 33 |
|  | Friendly | x |  | x | x |
|  | Clean | x |  | x |  |
|  | Fast repair | x |  | x | x |
|  | Cheap |  |  |  | x |
|  | Luxury Waiting Room |  |  |  |  |
| URA | Sex | 0.1429 | 0.0000 | 0.1429 | 0.1429 |
|  | Age | 0.1429 | 0.1357 | 0.1000 | 0.1386 |
|  | Friendly | 0.1429 | 0.0000 | 0.1429 | 0.1429 |
|  | Clean | 0.1429 | 0.0000 | 0.1429 | 0.0000 |
|  | Fast repair | 0.1429 | 0.0000 | 0.1429 | 0.1429 |
|  | Cheap | 0.1429 | 0.0000 | 0.0000 | 0.0000 |
|  | Luxury Waiting Room | 0.1429 | 0.0000 | 0.0000 | 0.0000 |
|  | URA Score | 1.0000 | 0.1357 | 0.6714 | 0.5671 |

In this specific example, Peter Pete obviously has the highest resemblance score with himself. User 1 on the other hand has the lowest resemblance score with Peter Pete. In this specific example, the fleet manager previously defined a resemblance threshold for a resemblance score of 0.5. In other words, only users having a resemblance score above 0.5 will be considered for the following steps. As outlined above, a resemblance list is generated comprising each service data object 230 associated with user data objects 220 having a resemblance score above the specified (predetermined or predeterminable) resemblance threshold. In other words, for each user data object 220 having a resemblance score above the resemblance threshold, a service data object 240 corresponding to the user data object 220 is extracted and stored in the resemblance list. The extracted service data object is the service data object 240 that was marked by the learning module 150 as 'selected' service data object when applying the learning method.

Accordingly, in this specific example, User 1 will be excluded while User 2 and User 3 will be contemplated. In particular, those service data objects 240 corresponding to User 2 and User 3 that were marked by the learning module 150 as 'selected' service data object 240 will be extracted.

In this specific example, the 'selected' service data objects 240 are those workshop data objects that were chosen from User 2 and User 3 in response to sending a client request 110, 210. However, also the deal-breaker criteria defined by the fleet manager need to be considered. In this specific example the workshop data object 240 corresponding to Workshop 4 and Workshop 5, respectively, are not part of pre-negotiated contracts of the fleet manager and are therefore excluded. The remaining relevant workshops data objects 240 are parsed in order to determine how often they were chosen in the past of User 2 and User 3. For Example, WS 2 was marked as selected workshop data object 240 four times, three times by User 2 and one time by User 3. Based on this, the resemblance score for WS 2 (URAScore$_{ws2}$) is calculated as follows (value 9 is the number of selection of each relevant workshop):

$$URA_{Score WS2} = \frac{3 \cdot 0.67 + 1 \cdot 0.56}{9} = 0.2856$$

$$URA_{Score WS1} = \frac{1 \cdot 0.67 + 0 \cdot 0.56}{9} = 0.0744$$

$$URA_{Score WS3} = \frac{0 \cdot 0.67 + 4 \cdot 0.56}{9} = 0.2489$$

Figure 12H:
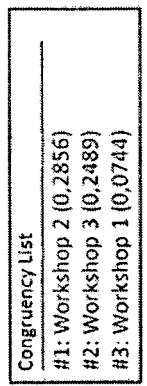
FIG. 12H shows an exemplary congruency list.
Figure 12I:
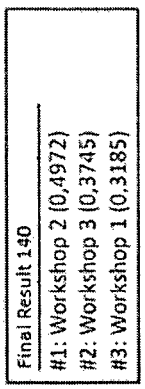
FIG. 12I shows an exemplary final result list.
Figure 12J:
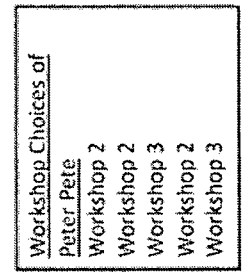
FIG. 12J shows exemplary workshop choices of a user Peter Pete.
Figure 12F:
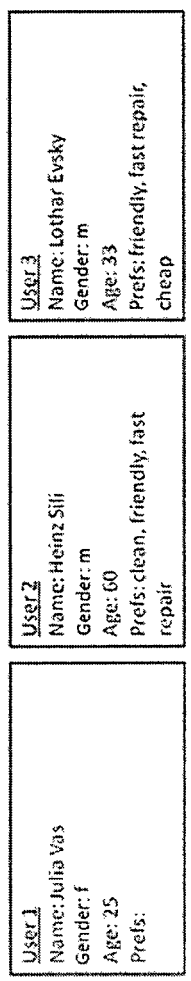
FIG. 12F shows three exemplary user data objects.
Figure 12G:
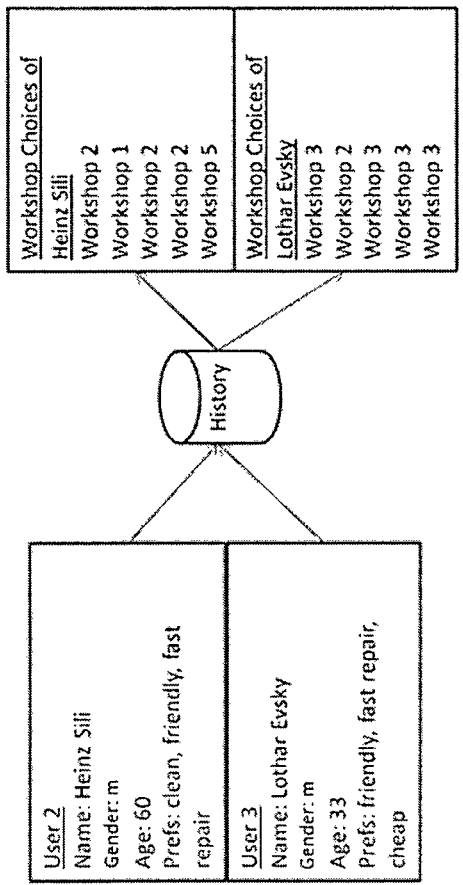
FIG. 12G shows two exemplary user data objects and two exemplary, respective workshop choices.

FIG. 12G shows the exemplary past workshop choices (i.e. the workshop data objects that were marked as selected workshop data objects) of User 2 and User 3 for the relevant workshops WS1, WS 2 and WS 3.

FIG. 12H shows the congruency list comprising the workshop data objects 240 having a congruency degree above the specified (predetermined or predeterminable) threshold.

Now, an exemplary Final Result 140 is generated by aggregating the congruency list and the resemblance list. In particular, the congruency list and the resemblance list are aggregated with individual weightings. In this example, the congruency list and the resemblance list have equal weightings, i.e. 0.5 each. The matching score for the relevant workshops is calculated as follows:

MatchingScore$_{WS2}$=0.5·0.70875+0.5·0.2856=0.4972

MatchingScore$_{WS3}$=0.5·0.5+0.5·0.2489=0.3745

MatchingScore$_{WS1}$=0.5·0.5625+0.5·0.0744=0.3185

FIG. 12I shows the final result list 140 comprising the workshop data objects 240 (WS1, WS2, WS3) based on their matching score in a descending order. The final result is forwarded to the learning module 150 as explained with reference to FIG. 8 above.

In the following, the adjustment of the matching algorithm (as applied by the matching module 105) of the learning engine 195 is demonstrated in view of this specific example. In this specific example, the requesting user, Peter Pete, is provided by the learning module first with WS2 (having the highest matching score). Peter Pete, however, sends to the learning module 150 a rejection notification. In accordance with the learning method, the learning module 150 provides Peter Pete with WS3 (which is now the first workshop data object in the modified final result 140). In response, Peter Pete sends an acceptance notification (and in this specific example so does a provider device corresponding to WS 2). The Learning Module 150 finishes the learning method and generates a learning result that comprises WS 3 as selected workshop data object 240.

The learning result is submitted to the learning engine 195. The learning engine 195 automatically applies the boosting algorithm 160. The boosting algorithm 160 adapts the weightings as assigned to the respective determinants. To do so, the boosting algorithm 160 analyses how to adapt the weightings assigned to the respective determinants in favor of WS3, since Peter Pete did not accept WS 2, which had the highest matching score. The boosting algorithm 160 adapts the weightings assigned to the determinants relevant for the congruency analysis 120, i.e. the weightings assigned to each determinant group and to each determinant within each determinant group. Further, the boosting algorithm 160 adapts the weightings of the determinants relevant to the user resemblance analysis 130. In other words, the boosting algorithm 160 adapts the weightings assigned to the determinants relevant for the congruency analysis 120 and the user resemblance analysis 140.

The boosting algorithm 160 will be exemplary explained in view of the Determinant Group 'Workshop' as shown in view of the exemplary Congruency Analysis above, i.e. the adaptation of the weighting assigned to the Determinant Group 'Workshop' and the adaptation of the weightings assigned to each of the determinants of the Determinant Group 'Workshop'.

To do so, the boosting algorithm 150 extracts the workshop data objects 240 that were chosen by Peter Pete (i.e. marked as selected workshop data objects 240 by the learning module 150 in view of previous client requests 110, 120). FIG. 12J shows the workshop data objects 240 that were chosen by Peter Pete.

In a next step, the boosting algorithm 160 calculates a potential of each determinant, i.e. weak learners, and generates a boosting basis. Based on the weak learners of the boosting basis, the boosting algorithm 160 adapts the weightings assigned to the corresponding determinants, which will be explained in the following. Table 7 shows the boosting basis generated by the boosting algorithm 160.

TABLE 7

Exemplary Boosting Basis

| | | Weak Learners | | | |
|---|---|---|---|---|---|
| | | Distance | External Rec | Internal Rec | Pricing Type |
| Previous Choices | WS2 | 0.33 | 0.5 | 1 | 0.5 |
| | WS2 | 0.33 | 0.5 | 1 | 0.5 |
| | WS3 | 0 | 1 | 0 | 0 |
| | WS2 | 0.33 | 0.5 | 1 | 0.5 |
| | WS3 | 0 | 1 | 0 | 0 |

Generating the boosting basis will be explained in view of the exemplary determinant Distance. As shown in Table 2, WS 3 has the smallest distance of all potential workshop data objects 240 (WS 1, WS 2, WS 3) and would therefore represent the 'optimal choice' for the determinant Distance. As shown in Table 4, the normalized value for determinant Distance for WS3 was 1, wherein the normalized determinant Distance for WS 2 was 0.67. The respective values in the Boosting Basis are calculated as follows:

1−normalizedValueDeterminant

Accordingly, the value for determinant Distance for WS 3 in the boosting basis is '0', wherein the value for determinant Distance for WS 2 in the boosting basis is '0.33'.

In the next step, for each weak learner m (i.e. determinant), a summarized error is calculated using an initial weighing of the boosting algorithm for each weak learner. The initial weighting is always equally distributed, i.e. since Peter Pete had 5 previous choices, each value for determinant Distance is assigned the weighting 0.2. Accordingly, each value for the determinant Distance in the boosting basis is multiplied with the weighting 0.2. From those multiplied values, a sum of each value for each determinant is calculated. The sum of each determinant is the summarized error for each weak learner. Table 8 shows the respective calculations generated based on the boosting basis shown in Table 7 above.

TABLE 8

Exemplary Summarized Errors

| | | Weak Learners | | | |
|---|---|---|---|---|---|
| | | Distance | External Rec | Internal Rec | Pricing Type |
| Previous Choices | WS2 | 0.066 | 0.1 | 0.2 | 0.1 |
| | WS2 | 0.066 | 0.1 | 0.2 | 0.1 |
| | WS3 | 0 | 0.2 | 0 | 0 |
| | WS2 | 0.066 | 0.1 | 0.2 | 0.1 |
| | WS3 | 0 | 0.2 | 0 | 0 |
| | | 0.198 | 0.7 | 0.6 | 0.3 |

Since the determinant Distance has the smallest summarized error 0.198, this weak learner has the highest potential for providing appropriate network responses to client requests 110, 210 of Peter Pete. Therefore, the boosting algorithm 160 assigns the determinant distance a higher weighting for future applications of the matching algorithm (as performed by the matching module 105 in response to further client requests 110, 210 of Peter Pete). In order to calculate the new weighting, the following calculation is applied:

$$\alpha_{(Distance)} = 0.5 \cdot \ln\frac{1-\frac{0.198}{1}}{\frac{0.198}{1}} = 0.3038$$

Based on the above calculation the updating of the weightings is calculated by the boosting algorithm as follows:

$$w_1^{(new)} = 0.2 \cdot e^{(-0.3038 \cdot (1-0.066))} = 0.1506$$

Table 9 shows the new weightings for the determinant Distance.

TABLE 9

New Weightings for Determinant Distance

|  |  | Weightings |
|---|---|---|
| Previous | WS2 | 0.1506 |
| Choices | WS2 | 0.1506 |
|  | WS3 | 0.1476 |
|  | WS2 | 0.1506 |
|  | WS3 | 0.1476 |
|  |  | 0.7470 |

As can be seen from Table 9, the sum of the new calculated weightings is 0.7470. Since the sum of the new weightings has to be '1', the new weightings need to be normalized, which will be explained with respect to the new weighting of WS 2:

$$w_1^{normalized} = \frac{0.1506}{0.7470} = 0.2016$$

Table 10 shows the normalized and hence updated weightings for determinant Distance.

TABLE 10

Normalized Updated Weightings for Determinant Distance

|  |  | Weightings |
|---|---|---|
| Previous | WS2 | 0.2016 |
| Choices | WS2 | 0.2016 |
|  | WS3 | 0.1976 |
|  | WS2 | 0.2016 |
|  | WS3 | 0.1976 |
|  |  | 1.0000 |

Table 11 shows the correspondingly recalculated weightings of the respective determinants/weak learners starting from Table 8. In a next step, the boosting algorithm 160 identifies the weak learner with the next-lowest summarized error. In this example, as can be seen from Table 11, the determinant Pricing is the weak learner with the next-lowest summarized error of 0.3024.

TABLE 11

Step 2 Boosting Algorithm

|  |  |  | Weak Learners | | | |
|---|---|---|---|---|---|---|
|  |  | Weightings | Distance | External Rec | Internal Rec | Pricing Type |
| Previous | WS2 | 0.2016 | 0.0665 | 0.1008 | 0.2016 | 0.1008 |
| Choices | WS2 | 0.2016 | 0.0665 | 0.1008 | 0.2016 | 0.1008 |
|  | WS3 | 0.1976 | 0.0000 | 0.1976 | 0.0000 | 0.0000 |
|  | WS2 | 0.2016 | 0.0665 | 0.1008 | 0.2016 | 0.1008 |
|  | WS3 | 0.1976 | 0.0000 | 0.1976 | 0.0000 | 0.0000 |
|  |  | 1.0000 | 0.1996 | 0.6976 | 0.6048 | 0.3024 |

Similar to the calculation of above, $\alpha_{PricingType}$ is calculated. In particular, $$\alpha_{PricingType} = 0.5 \cdot \ln\left(\frac{1 - \frac{0.3024}{1}}{\frac{0.3024}{1}}\right) = 0.1815$$

In a next step, the weightings of determinant Pricing Type are updated as follows:

$$w_1^{new} = 0.2016 \cdot e^{(-0.1815 \cdot (1 - 0.0665))} = 0.1712$$

The respectively updated weightings for determinant Pricing Type can be seen in Table 12.

TABLE 12

Updated Weightings for Determinant Pricing Type

|  |  | Weightings |
|---|---|---|
| Previous | WS2 | 0.1712 |
| Choices | WS2 | 0.1712 |
|  | WS3 | 0.1648 |
|  | WS2 | 0.1712 |
|  | WS3 | 0.1648 |
|  |  | 0.8433 |

Further, the respectively normalized updated weightings for determinant Pricing Type are depicted in Table 13.

TABLE 13

Normalized Updated Weightings for Determinant Pricing Type

|  |  | Weightings |
|---|---|---|
| Previous | WS2 | 0.2031 |
| Choices | WS2 | 0.2031 |
|  | WS3 | 0.1954 |
|  | WS2 | 0.2031 |
|  | WS3 | 0.1954 |
|  |  | 1.0000 |

Table 14 shows the respectively recalculated values for all weak learners and for all past choices.

TABLE 14

Recalculated Weightings for All Weak Learners

|  |  |  | Weak Learners | | | |
|---|---|---|---|---|---|---|
|  |  | Weightings | Distance | External Rec | Internal Rec | Pricing Type |
| Previous | WS2 | 0.2031 | 0.0670 | 0.1015 | 0.2031 | 0.1015 |
| Choices | WS2 | 0.2031 | 0.0670 | 0.1015 | 0.2031 | 0.1015 |
|  | WS3 | 0.1954 | 0.0000 | 0.1954 | 0.0000 | 1.0000 |
|  | WS2 | 0.2031 | 0.0670 | 0.1015 | 0.2031 | 0.1015 |
|  | WS3 | 0.1954 | 0.0000 | 0.1954 | 0.0000 | 1.0000 |
|  |  | 1.0000 | 0.2010 | 0.6954 | 0.6048 | 0.3024 |

The remaining two weak learners (External Rec and Internal Rec) both have a summarized error-value exceeding 0.5. In this specific example, the boosting algorithm 160 identifies these two weak learners to not have enough potential, based on the past choices of Peter Pete, to be used for future client requests 110, 210 of Peter Pete. Therefore, a weighting of 0 is assigned to both weak learners. Table 15 shows the new weightings assigned to the determinants, i.e. the reassigned weightings.

TABLE 15

Reassigned Weightings

| | Weak Learners | | | |
|---|---|---|---|---|
| | Distance | External Rec | Internal Rec | Pricing Type |
| Weightings | 0.3038 | 0 | 0 | 0.1815 |

These weightings also need to be normalized, since the sum of the weightings has to be 1. Table 16 shows the normalized new weightings assigned to the determinants for the congruency analysis 120 of future client requests 110, 210 of Peter Pete. The updated weightings may be stored a in a Learning Container individually assigned to Peter Pete. Accordingly, upon receiving a next client request 110, 210 having the user ID of Peter Pete, the matching module 105 will apply the matching algorithm based on the updated determinants stored in the Learning Container assigned to Peter Pete.

TABLE 16

Normalized Reassigned Weightings

| | Weak Learners | | | |
|---|---|---|---|---|
| | Distance | External Rec | Internal Rec | Pricing Type |
| Weightings | 0.6260 | 0.0000 | 0.0000 | 0.3740 |

It is noted that the weighting of each determinant for the congruency analysis 120 and for aggregating the congruency list and the resemblance list are updated according as exemplarily explained above.

In the following, the updating of the weightings of the determinants relevant for the user resemblance analysis 130 will be explained. Since the relevant determinants for the user resemblance analysis 130 may differ, the learning engine applies different calculations. Users corresponding to user data objects 220 stored in the request database 155 and/or in the response database 165 having chosen the same workshop data objects 240 as Peter Pete should have a higher resemblance score assigned. FIG. 13A shows exemplary similar choices of User 2 (Heinz Sili) and User 3 (Lothar Evsky).

Returning to this specific example, the learning engine 195 updates the weightings of the determinants relevant for the user resemblance analysis 130 such that User 2 and User 3 will have a higher resemblance score in view of Peter Pete. Therefore, the Boosting Basis for the user resemblance analysis is shown in FIG. 13B. After choosing a specific workshop, the system may collect information about different users that have also chosen that specific workshop in the past. This is exemplarily shown in FIG. 13B. The collected information may be subsequently used for updating of the weighting for the User Resemblance Analysis.

Based on the boosting basis for the user resemblance analysis 130 as depicted in FIG. 13B, the boosting algorithm 160 adapts the weightings of the respective determinants as outlined above.

Moreover, the learning engine comprises the sentiment engine 195. The sentiment engine 195 further adapts the weighting of relevant determinants based on user feedback. The adaptation of the weightings by the sentiment engine 195 will be in the following explained with reference to the specific example above.

The sentiment engine 170 receives the learning result from the learning module 150. As outlined above, the learning result comprises the accepted workshop data object 240 corresponding to WS 3. Peter Pete is invited to provide feedback about the service received in WS 3. The feedback can be provided as follows:
  free-text feedback, which is analyzed by the sentiment engine 170 for relevant keywords;
  Yes/No feedback in response to specific questions;
  a scale-based recommendations in response to a specified (predetermined or predeterminable) scale.

FIG. 13C shows a specific example for Yes/No feedback received from Peter Pete. In this specific example of FIG. 13C, Peter Pete prefers clean workshops with friendly employees providing fast repair services. The fact that the determinants 'cheap' and 'luxury waiting room' were not included in Peter Pete's preference container can have two reasons. It may have not been important to Peter Pete or Peter Pete just forgot define these preferences. In reaction to the exemplary Yes/No feedback, the determinant 'cheap' will be added to Peter Pete's preference container (as stored in the determinant Preferences in the respective user data object 220 of Peter Pete).

FIG. 13D shows an exemplary free-text feedback received at the sentiment engine 170 from Peter Pete. To support the sentiment engine 170, Peter Pete can additionally highlight important keywords. In this specific example, Peter Pete may highlight that WS 3 does not accept credit cards. The sentiment engine 170 parses this feedback to extract relevant keywords (as explained with reference to FIG. 7 above). In this specific example, the extracted keywords 'clean' and 'friendly' are already in the preference container of Peter Pete. However, based on the highlighted part of the free-text feedback, the sentiment engine 170 will perform the following operations:
  the keywords 'accept credit cards' will be added to Peter Pete's preference container;
  the keywords 'accept credit cards' sill be added to a keyword library used by the sentiment engine 170.

The keyword library used by the sentiment engine may be structured like a pyramid. The keywords may be ordered by their importance, i.e. the most important keyword is on top of the pyramid. Importance in this context means number of mentions of users within their free text feedback. Using the pyramid-structure in the library has the technical advantage that the library is not overloaded with unimportant or outdated keywords. Accordingly, more accurate network responses to client requests 110, 210 can be provided. Additionally, the library may delete that have an importance below a specified (predetermined or predeterminable) importance-threshold. The library may perform such deletion in specified (predetermined or predeterminable) time-intervals.

With reference to this specific example, this means that— assuming Peter Pete is the only user that prefers to pay via credit card—this keyword might be deleted from the library at some point in time. However, this preference will remain in his personal preference container stored in the determinant Preference of the respective user data object.

Figure 14:
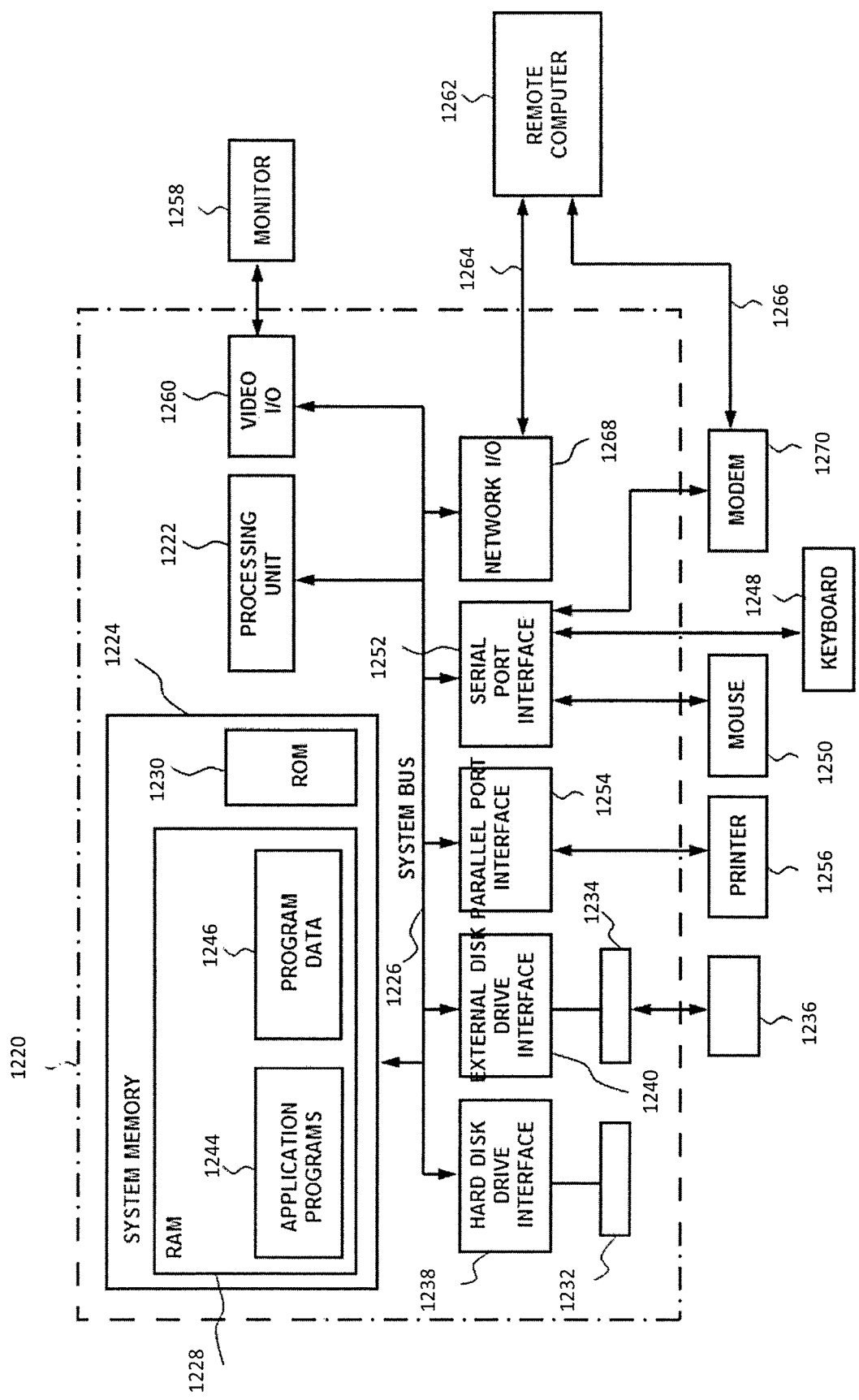
FIG. 14 shows an exemplary system for implementing the invention.

FIG. 14 shows an exemplary system for implementing the invention including a general purpose computing device in the form of a conventional computing environment 1220 (e.g. a personal computer). The conventional computing environment includes a processing unit 1222, a system memory 1224, and a system bus 1226. The system bus couples various system components including the system memory 1224 to the processing unit 1222. The processing unit 1222 may perform arithmetic, logic and/or control operations by accessing the system memory 1224. The system memory 1224 may store information and/or instructions for use in combination with the processing unit 1222. The system memory 1224 may include volatile and nonvolatile memory, such as a random access memory (RAM) 1228 and a read only memory (ROM) 1230. A basic input/output system (BIOS) containing the basic routines that helps to transfer information, between elements within the personal computer 1220, such as during start-up, may be stored in the ROM 1230. The system bus 1226 may be any of several types of bus structures including a memory bus or memory controller, a peripheral bus, and a local bus using any of a variety of bus architectures.

The personal computer 1220 may further include a hard disk drive 1232 for reading from and writing to a hard disk (not shown), and an external disk drive 1234 for reading from or writing to a removable disk 1236. The removable disk may be a magnetic disk for a magnetic disk driver or an optical disk such as a CD ROM for an optical disk drive. The hard disk drive 1232 and the external disk drive 1234 are connected to the system bus 1226 by a hard disk drive interface 1238 and an external disk drive interface 1240, respectively. The drives and their associated computer-readable media provide nonvolatile storage of computer readable instructions, data structures, program modules and other data for the personal computer 1220. The data structures may include relevant data for the implementation of the method for natural language-based control of a digital network, as described above. The relevant data may be organized in a database, for example a relational database management system or an object-oriented database management system.

Although the exemplary environment described herein employs a hard disk (not shown) and an external disk 1236, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 1236, ROM 1230 or RAM 1228, including an operating system (not shown), one or more application programs 1244, other program modules (not shown), and program data 1246. The application programs may include at least a part of the functionality as depicted in FIGS. 1 to 11.

A user may enter commands and information, as discussed below, into the personal computer 1220 through input devices such as keyboard 1248 and mouse 1250. Other input devices (not shown) may include a microphone (or other sensors), joystick, game pad, scanner, or the like. These and other input devices may be connected to the processing unit 1222 through a serial port interface 1252 that is coupled to the system bus 1226, or may be collected by other interfaces, such as a parallel port interface 1254, game port or a universal serial bus (USB). Further, information may be printed using printer 1256. The printer 1256 and other parallel input/output devices may be connected to the processing unit 1222 through parallel port interface 1254. A monitor 1258 or other type of display device is also connected to the system bus 1226 via an interface, such as a video input/output 1260. In addition to the monitor, computing environment 1220 may include other peripheral output devices (not shown), such as speakers or other audible output.

The computing environment 1220 may communicate with other electronic devices such as a computer, telephone (wired or wireless), personal digital assistant, television, or the like. To communicate, the computer environment 1220 may operate in a networked environment using connections to one or more electronic devices. FIG. 12 depicts the computer environment networked with remote computer 1262. The remote computer 1262 may be another computing environment such as a server, a router, a network PC, a peer device or other common network node, and may include many or all of the elements described above relative to the computing environment 1220. The logical connections depicted in FIG. 12 include a local area network (LAN) 1264 and a wide area network (WAN) 1266. Such networking environments are commonplace in offices, enterprise-wide computer networks, intranets and the Internet and may particularly be encrypted.

When used in a LAN networking environment, the computing environment 1220 may be connected to the LAN 1264 through a network I/O 1268. When used in a WAN networking environment, the computing environment 1220 may include a modem 1270 or other means for establishing communications over the WAN 1266. The modem 1270, which may be internal or external to computing environment 1220, is connected to the system bus 1226 via the serial port interface 1252. In a networked environment, program modules depicted relative to the computing environment 1220, or portions thereof, may be stored in a remote memory storage device resident on or accessible to remote computer 1262. Furthermore other data relevant to the method for optimization of evaluation of a policy (described above) may be resident on or accessible via the remote computer 1262. It will be appreciated that the network connections shown are exemplary and other means of establishing a communications link between the electronic devices may be used.

The above-described computing system is only one example of the type of computing system that may be used to implement the method for natural language-based control of a digital network.

The invention claimed is:

1. A computer network for adaptively adjusting network responses to client requests to provide improved network responses, the computer network comprising:
   at least one client device for generating and transmitting client requests;
   at least one provider for reacting to a client request via an adaptive machine-learning system; and
   the adaptive machine-learning system comprising:
   a parsing module operable to perform the following steps:
      receiving a client request from a client device, the client request comprising at least a user ID and an object ID being subject of the client request;
      parsing a request database for determining further relevant data based on the user ID and the object ID;
      extracting the further relevant data from the request database to generate extracted data;
      enriching the client request with the extracted data to generate an enriched client request; and
      generating a request data object based on the enriched client request;
   a matching module operable to perform the following steps:

extracting respective determinants of the request data object and data objects stored in a response database, wherein each determinant is an attribute of a data object;
extracting weightings associated with the extracted determinants of the request data object and data objects stored in the response database;
applying a matching algorithm on the request data object with data objects stored in the response database to calculate a matching score of potential service data objects based on the extracted weightings; and
generating a final result, wherein the final result comprises a list of service data objects based on the matching score calculated by the matching algorithm;
a learning module operable to perform the steps of:
receiving the final result from the matching module;
applying a learning method based on the final result, wherein applying the learning method comprises the steps of:
extracting the first service data object from the final result;
parsing the extracted service data object to identify relevant data associated with the extracted service data object;
generating an acceptance query based on the identified relevant data;
transmitting the acceptance query to the client device and a provider device corresponding to the service data object;
receiving a query feedback from the client device and the provider device;
if the query feedback of the client device and the provider device is an acceptance notification:
tagging the extracted first service data object as selected service data object;
parsing the response database for relevant contract data associated with the extracted service data object;
generating a contract information notification comprising the relevant contract data; and
transmitting the contract information notification to the client device and the provider device;
if the query feedback of the client device or the provider device is a rejection notification:
generating a modified final result list by removing the first service data object from the final result; and
applying the learning method using the modified final result list; and
generating a learning result of the learning method, the learning result comprising a selected service data object of the final result; and
a learning engine operable to adapt the matching algorithm of the matching module based on the learning result, wherein adapting the matching algorithm comprises applying a boosting algorithm for adapting the weightings associated with the determinants in the response database, the boosting algorithm comprising the steps of:
generating a boosting basis taking into account the current weightings assigned to the determinants;
calculating an error for each weighting;
identifying a determinant with the smallest calculated error; and
updating the weighting associated with the identified determinant the response database based on the current weighting and the calculated error;

wherein the client device, the provider and the adaptive machine-learning system are coupled via a network.

2. The computer network of claim 1, wherein updating (640) the weighting for the determinant is performed based on the following formulae:

$$\alpha_m = \frac{1}{2}\ln\left(\frac{1-\frac{\epsilon_m}{W_n}}{\frac{\epsilon_m}{W_n}}\right); w_{x_i}^{(new)} = w_{x_i}^{(old)} \cdot e^{(-\alpha_m \cdot (1-y_i))};$$

wherein $w_n$ is a sum of all weightings of the determinant, $w_i$;
$\Sigma_m$ is a sum of weighted errors calculated for each determinant;
$a_m$ is calculated for a determinant with a smallest sum of weighted errors, $\Sigma_m$; and
$y_i$ is a calculated error of the determinant with the smallest calculated error.

3. The computer network of claim 1, wherein calculating the matching score comprises:
applying a congruency analysis comprising the steps of:
calculating a congruency degree between the request data object and each service data object stored in the response database wherein calculating the congruency degree comprises matching hard facts in the request data object with corresponding hard facts of each service data object stored in the response database, wherein the hard facts are determinants of each data object corresponding to the object ID; and
generating a congruency list comprising all service data objects having a congruency degree above a specified congruency threshold;
applying a user resemblance analysis comprising the steps of:
calculating a resemblance score between a user data object corresponding to the user ID and each user data object stored in the response database, wherein calculating the resemblance score comprises matching soft facts in the request data object with corresponding soft facts of each user data object stored in the response database, wherein the soft facts are determinants of each data object corresponding to the user ID and may comprise one or more of:
an age of a user;
a gender of a user;
previously defined preferences of a user;
user recommendations; and
generating a resemblance list comprising all service data objects associated with user data objects having a resemblance score above a specified resemblance threshold; and
calculating the matching score for each service data object by aggregating the congruency degree and the resemblance score of the respective service data object; and
generating the final result comprising a list of all service data objects having a matching score above a specified matching threshold.

4. The computer network of claim 2, wherein calculating the matching score comprises:
applying a congruency analysis comprising the steps of:
calculating a congruency degree between the request data object and each service data object stored in the response database wherein calculating the congruency degree comprises matching hard facts in the request data object with corresponding hard facts of each service data object stored in the response database, wherein the hard facts are determinants of each data object corresponding to the object ID; and
generating a congruency list comprising all service data objects having a congruency degree above a specified congruency threshold;
applying a user resemblance analysis comprising the steps of:
calculating a resemblance score between a user data object corresponding to the user ID and each user data object stored in the response database, wherein calculating the resemblance score comprises matching soft facts in the request data object with corresponding soft facts of each user data object stored in the response database, wherein the soft facts are determinants of each data object corresponding to the user ID and may comprise one or more of:
an age of a user;
a gender of a user;
previously defined preferences of a user;
user recommendations; and
generating a resemblance list comprising all service data objects associated with user data objects having a resemblance score above a specified resemblance threshold; and
calculating the matching score for each service data object by aggregating the congruency degree and the resemblance score of the respective service data object; and
generating the final result comprising a list of all service data objects having a matching score above a specified matching threshold.

5. The computer network of claim 3, further comprising:
implementing each data object stored in the request database and the response database as multi-dimensional vector object, by implementing each determinant of data object as a dimension of a vector; and calculating the congruency degree and the resemblance score using vector comparison between the each pair data objects, respectively, by calculating the congruency degree and the resemblance score based on an angle between each pair of determinant of the respective data object.

6. The computer network of claim 4, further comprising:
implementing each data object stored in the request database and the response database as multi-dimensional vector object, by implementing each determinant of data object as a dimension of a vector; and calculating the congruency degree and the resemblance score using vector comparison between the each pair data objects, respectively, by calculating the congruency degree and the resemblance score based on an angle between each pair of determinant of the respective data object.

7. The computer network of claim 1, wherein the learning engine further comprises:
a sentiment engine operable to perform the steps of:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

8. The computer network of claim 2, wherein the learning engine further comprises:
a sentiment engine operable to perform the steps of:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

9. The computer network of claim 3, wherein the learning engine further comprises:
a sentiment engine operable to perform the steps of:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

10. The computer network of claim 4, wherein the learning engine further comprises:
a sentiment engine operable to perform the steps of:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

11. The computer network of claim 5, wherein the learning engine further comprises:
a sentiment engine operable to perform the steps of:
receiving feedback about the service corresponding to the selected service data object from a user associated with the user ID;

identifying positive and negative keywords in the received feedback of the user by parsing the received feedback;

extracting a determinant of the selected service data object associated with user recommendations from the response database;

extracting a weighting associated with the extracted determinant of the selected service data object from the response database; and adapting the extracted weighting of the selected service data object based on the identified keywords in the response database.

12. The computer network of claim 6, wherein the learning engine further comprises:

a sentiment engine operable to perform the steps of:

receiving feedback about the service corresponding to the selected service data object from a user associated with the user ID;

identifying positive and negative keywords in the received feedback of the user by parsing the received feedback;

extracting a determinant of the selected service data object associated with user recommendations from the response database;

extracting a weighting associated with the extracted determinant of the selected service data object from the response database; and adapting the extracted weighting of the selected service data object based on the identified keywords in the response database.

13. A computer-implemented method for adaptively adjusting network responses to client requests to provide improved network responses, the method comprising:

receiving a client request from a client device, the client request comprising at least a user ID and an object ID being subject of the client request;

parsing a request database for determining further relevant data based on the user ID and the object ID;

extracting the further relevant data from the request database to generate extracted data;

enriching the client request with the extracted data to generate an enriched client request; and generating a request data object based on the enriched client request;

extracting respective determinants of the request data object and data objects stored in a response database, wherein each determinant is an attribute of a data object;

extracting weightings associated with the extracted determinants of the request data object and data objects stored in the response database;

applying a matching algorithm on the request data object with data objects stored in the response database to calculate a matching score of potential service data objects based on the extracted weightings; and generating a final result, wherein the final result comprises a list of service data objects based on the matching score calculated by the matching algorithm;

receiving the final result from the matching module;

applying a learning method based on the final result, wherein applying the learning method comprises the steps of:

extracting the first service data object from the final result;

parsing the extracted service data object to identify relevant data associated with the extracted service data object;

generating an acceptance query based on the identified relevant data;

transmitting the acceptance query to the client device and a provider device corresponding to the service data object;

receiving a query feedback from the client device and the provider device;

if the query feedback of the client device and the provider device is an acceptance notification:

tagging the extracted first service data object as selected service data object;

parsing the response database for relevant contract data associated with the extracted service data object;

generating a contract information notification comprising the relevant contract data; and transmitting the contract information notification to the client device and the provider device;

if the query feedback of the client device or the provider device is a rejection notification:

generating a modified final result list by removing the first service data object from the final result; and applying the learning method using the modified final result list; and generating a learning result of the learning method, the learning result comprising a selected service data object of the final result; and adapting the matching algorithm of the matching module based on the learning result, wherein adapting the matching algorithm comprises applying a boosting algorithm for adapting the weightings associated with the determinants in the response database, the boosting algorithm comprising the steps of:

generating a boosting basis taking into account the current weightings assigned to the determinants;

calculating an error for each weighting;

identifying a determinant with the smallest calculated error; and updating the weighting associated with the identified determinant the response database based on the current weighting and the calculated error.

14. The computer-implemented method of claim 13, wherein calculating the matching score comprises:

applying a congruency analysis comprising the steps of:

calculating a congruency degree between the request data object and each service data object stored in the response database, wherein calculating the congruency degree comprises matching hard facts in the request data object with corresponding hard facts of each service data object stored in the response database, wherein the hard facts are determinants of each data object corresponding to the object ID; and generating a congruency list comprising all service data objects having a congruency degree above a specified congruency threshold;

applying a user resemblance analysis comprising the steps of:

calculating a resemblance score between a user data object corresponding to the user ID and each user data object stored in the response database, wherein calculating the resemblance score comprises matching soft facts in the request data object with corresponding soft facts of each user data object stored in the response database, wherein the soft facts are determinants of each data object corresponding to the user ID and may comprise one or more of:

an age of a user;

a gender of a user;

previously defined preferences of a user;
user recommendations; and
generating a resemblance list comprising all service data objects associated with user data objects having a resemblance score above a specified resemblance threshold; and
calculating the matching score for each service data object by aggregating the congruency degree and the resemblance score of the respective service data object; and
generating the final result comprising a list of all service data objects having a matching score above a specified matching threshold.

15. The computer-implemented method of claim 14, wherein each data object stored in the request database and the response database is implemented as multi-dimensional vector object, where each determinant of a data object is implemented as a dimension of a vector; the method further comprising:
calculating the congruency degree and the resemblance score using vector comparison between the each pair data objects, respectively, by calculating the congruency degree and the resemblance score based on an angle between each pair of determinant of the respective data object.

16. The computer-implemented method of claim 13, wherein adapting the matching algorithm of the matching module based on the learning result further comprises:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

17. The computer-implemented method of claim 14, wherein adapting the matching algorithm of the matching module based on the learning result further comprises:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

18. The computer-implemented method of claim 15, wherein adapting the matching algorithm of the matching module based on the learning result further comprises:
receiving feedback about the service corresponding to the selected service data object from a user associated with the user ID;
identifying positive and negative keywords in the received feedback of the user by parsing the received feedback;
extracting a determinant of the selected service data object associated with user recommendations from the response database;
extracting a weighting associated with the extracted determinant of the selected service data object from the response database; and
adapting the extracted weighting of the selected service data object based on the identified keywords in the response database.

19. An adaptive machine-learning system for adaptively adjusting network responses to client requests to provide improved network responses, the system comprising a processor configured to execute:
a parsing module operable to perform the following steps:
receiving a client request from a client device, the client request comprising at least a user ID and an object ID being subject of the client request;
parsing a request database for determining further relevant data based on the user ID and the object ID;
extracting the further relevant data from the request database to generate extracted data;
enriching the client request with the extracted data to generate an enriched client request; and
generating a request data object based on the enriched client request;
a matching module operable to perform the following steps:
extracting respective determinants of the request data object and data objects stored in a response database, wherein each determinant is an attribute of a data object;
extracting weightings associated with the extracted determinants of the request data object and data objects stored in the response database;
applying a matching algorithm on the request data object with data objects stored in the response database to calculate a matching score of potential service data objects based on the extracted weightings; and
generating a final result, wherein the final result comprises a list of service data objects based on the matching score calculated by the matching algorithm;
a learning module operable to perform the steps of:
receiving the final result from the matching module;
applying a learning method based on the final result, wherein applying the learning method comprises the steps of:
extracting the first service data object from the final result;
parsing the extracted service data object to identify relevant data associated with the extracted service data object;
generating an acceptance query based on the identified relevant data;
transmitting the acceptance query to the client device and a provider device corresponding to the service data object;
receiving a query feedback from the client device and the provider device;
if the query feedback of the client device and the provider device is an acceptance notification:
tagging the extracted first service data object as selected service data object;

parsing the response database for relevant contract data associated with the extracted service data object;
generating a contract information notification comprising the relevant contract data; and
transmitting the contract information notification to the client device and the provider device;
if the query feedback of the client device or the provider device is a rejection notification:
generating a modified final result list by removing the first service data object from the final result; and
applying the learning method using the modified final result list; and
generating a learning result of the learning method, the learning result comprising a selected service data object of the final result; and
a learning engine operable to adapt the matching algorithm of the matching module based on the learning result, wherein adapting the matching algorithm comprises applying a boosting algorithm for adapting the weightings associated with the determinants in the response database, the boosting algorithm comprising the steps of:
generating a boosting basis taking into account the current weightings assigned to the determinants;
calculating an error for each weighting;
identifying a determinant with the smallest calculated error; and
updating the weighting associated with the identified determinant the response database based on the current weighting and the calculated error.

20. A computer program product comprising a machine-readable medium storing instructions that, when executed by at least one programmable processor, cause the at least one programmable processor to perform operations according to the method of claim 13.

21. A computer program product comprising a machine-readable medium storing instructions that, when executed by at least one programmable processor, cause the at least one programmable processor to perform operations according to the method of claim 14.

22. A computer program product comprising a machine-readable medium storing instructions that, when executed by at least one programmable processor, cause the at least one programmable processor to perform operations according to the method of claim 15.

23. A computer program product comprising a machine-readable medium storing instructions that, when executed by at least one programmable processor, cause the at least one programmable processor to perform operations according to the method of claim 16.

24. A computer program product comprising a machine-readable medium storing instructions that, when executed by at least one programmable processor, cause the at least one programmable processor to perform operations according to the method of claim 17.

25. A computer program product comprising a machine-readable medium storing instructions that, when executed by at least one programmable processor, cause the at least one programmable processor to perform operations according to the method of claim 18.

* * * * *